US012756241B2

(12) United States Patent
Tachiwa

(10) Patent No.: US 12,756,241 B2
(45) Date of Patent: Oct. 6, 2026

(54) POWER TRANSMITTING APPARATUS, POWER RECEIVING APPARATUS, CONTROL METHOD, AND STORAGE MEDIUM

(71) Applicant: CANON KABUSHIKI KAISHA, Tokyo (JP)

(72) Inventor: Wataru Tachiwa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 18/057,504

(22) Filed: Nov. 21, 2022

(65) Prior Publication Data

US 2023/0082647 A1 Mar. 16, 2023

Related U.S. Application Data

(63) Continuation of application No. PCT/JP2021/017611, filed on May 10, 2021.

(30) Foreign Application Priority Data

May 22, 2020 (JP) ................................ 2020-089936

(51) Int. Cl.
*H02J 50/60* (2016.01)
*H02J 50/10* (2016.01)
*H02J 50/80* (2016.01)

(52) U.S. Cl.
CPC .............. *H02J 50/60* (2016.02); *H02J 50/10* (2016.02); *H02J 50/80* (2016.02)

(58) Field of Classification Search
CPC ............. H02J 50/60; H02J 50/80; H02J 50/10
USPC .......................................................... 307/104
See application file for complete search history.

(56) References Cited

U.S. PATENT DOCUMENTS

| | | | | |
|---|---|---|---|---|
| 8,169,185 | B2 | 5/2012 | Partovi et al. | |
| 8,620,484 | B2 * | 12/2013 | Baarman | H02J 50/60 363/16 |
| 8,957,549 | B2 * | 2/2015 | Kesler | H03H 7/40 307/104 |
| 9,148,201 | B2 * | 9/2015 | Kallal | H02J 50/80 |
| 9,294,153 | B2 * | 3/2016 | Muratov | H04B 5/266 |
| 9,505,315 | B2 * | 11/2016 | Garcia Briz | G01V 3/10 |
| 9,735,623 | B2 * | 8/2017 | Byun | H02J 50/80 |
| 9,793,717 | B2 * | 10/2017 | White, II | H04B 5/24 |
| 9,859,719 | B2 | 1/2018 | Vuori et al. | |
| 9,929,601 | B2 * | 3/2018 | White | G01V 3/12 |
| 9,985,481 | B2 | 5/2018 | Elad et al. | |
| 9,991,731 | B2 * | 6/2018 | Ichikawa | H04B 5/79 |
| 10,164,600 | B2 | 12/2018 | Kormann et al. | |
| 10,530,196 | B2 | 1/2020 | Oettinger et al. | |
| 10,790,703 | B2 * | 9/2020 | Yoden | H02J 50/05 |

(Continued)

FOREIGN PATENT DOCUMENTS

| | | | |
|---|---|---|---|
| CN | 102414955 | A | 4/2012 |
| CN | 102638110 | A | 8/2012 |

(Continued)

*Primary Examiner* — Alfonso Perez Borroto
(74) *Attorney, Agent, or Firm* — Canon U.S.A., Inc. IP Division

(57) ABSTRACT

A power transmitting apparatus performs detection processing for detecting an object different from a power receiving apparatus, and performs processing for a parameter used in the detection processing based on a voltage change of a voltage applied to a transmitting unit.

11 Claims, 17 Drawing Sheets

(56) References Cited

U.S. PATENT DOCUMENTS 10,938,243 B2 * 3/2021 Kim ........................ H02J 50/20
11,005,285 B2 5/2021 Partovi
2009/0127936 A1 5/2009 Kamijo et al.
2009/0322280 A1 * 12/2009 Kamijo ................. H02J 7/0044 320/108
2010/0315038 A1 12/2010 Terao et al.
2010/0315039 A1 12/2010 Terao et al.
2011/0196544 A1 * 8/2011 Baarman ................. H02J 50/60 700/291
2012/0153894 A1 * 6/2012 Widmer ................ B60L 53/126 320/108
2012/0212070 A1 8/2012 Tanabe
2012/0299391 A1 * 11/2012 Tanabe .................... H02J 50/12 307/104
2013/0033235 A1 * 2/2013 Fukaya ................... H02J 50/80 307/104
2013/0162220 A1 * 6/2013 Lijima .................. H02J 50/005 320/137
2013/0241293 A1 9/2013 Yamaguchi
2013/0285618 A1 10/2013 Iijima et al.
2014/0292094 A1 * 10/2014 Tsukamoto ............. H02J 50/80 307/104
2015/0054453 A1 2/2015 White et al.
2015/0054454 A1 * 2/2015 White ...................... G01V 3/12 320/108
2015/0115728 A1 * 4/2015 Yamamoto .............. H02J 50/60 307/104
2015/0145341 A1 * 5/2015 Chiyo ..................... H02J 50/10 336/170
2015/0280453 A1 10/2015 Ikefuji
2015/0349541 A1 * 12/2015 Yamamoto ............ H02J 50/402 307/104
2015/0372496 A1 12/2015 Lee et al.
2016/0211703 A1 7/2016 Eguchi
2016/0372976 A1 * 12/2016 Shimura .................. H04B 5/79
2017/0093214 A1 3/2017 Watanabe et al.
2017/0117750 A1 * 4/2017 Tsukamoto ............. H02J 50/10
2017/0155280 A1 * 6/2017 Okamoto ................ H02J 50/10
2017/0324252 A1 11/2017 Yamamoto et al.
2018/0131218 A1 5/2018 Shellhammer et al.
2018/0269714 A1 * 9/2018 Samuelsson ............ H02J 50/90
2018/0301946 A1 * 10/2018 Eguchi .................... H02J 50/40
2019/0013703 A1 * 1/2019 Shichino ................. H02J 50/12
2019/0020210 A1 * 1/2019 Partovi ................... B60L 53/36
2019/0312462 A1 10/2019 Shichino
2019/0334583 A1 * 10/2019 Tsukamoto ............. H02J 50/10
2020/0259369 A1 * 8/2020 Stingu ..................... H02J 50/50
2021/0066973 A1 3/2021 Park et al.

FOREIGN PATENT DOCUMENTS

| | | | |
|---|---|---|---|
| CN | 103852631 | A | 6/2014 |
| CN | 105449799 | A | 3/2016 |
| CN | 105474511 | A | 4/2016 |
| CN | 106560980 | A | 4/2017 |
| CN | 108702032 | A | 10/2018 |
| EP | 3376638 | A2 | 9/2018 |
| EP | 3457527 | A1 | 3/2019 |
| EP | 4007122 | A1 | 6/2022 |
| EP | 4009489 | A1 | 6/2022 |
| JP | 2015-033246 | A | 2/2015 |
| JP | 2015-104141 | A | 6/2015 |
| JP | 2016-531538 | A | 10/2016 |
| JP | 2017-070074 | A | 4/2017 |
| JP | 2017-085716 | A | 5/2017 |
| JP | 2017-099230 | A | 6/2017 |
| JP | 2017-537598 | A | 12/2017 |
| JP | 2018-108014 | A | 7/2018 |
| JP | 2018133993 | A | 8/2018 |
| JP | 2019-187043 | A | 10/2019 |
| JP | 2020072577 | A | 5/2020 |
| WO | 2015/007696 | A1 | 1/2015 |
| WO | 2016/091764 | A1 | 6/2016 |
| WO | 2019139326 | A1 | 7/2019 |

* cited by examiner

FIG. 8

800

| | RECEIVED POWER [W] | POWER LOSS [W] |
|---|---|---|
| 801 | 0.1 | 0.6 |
| 802 | 4.9 | 1.6 |
| 803 | 9.9 | 3.5 |
| | ⋮ | ⋮ |

FIG. 10

1001

| GP | INPUT VOLTAGE TO POWER TRANSMITTING UNIT |
|---|---|
| 0W OR MORE AND LESS THAN 15W | 5V |
| 15W OR MORE AND LESS THAN 27W | 9V |
| 27W OR MORE AND LESS THAN 45W | 15V |
| 45W OR MORE | 20V |

1002

| GP | OUTPUT VOLTAGE TO CHARGING UNIT |
|---|---|
| 0W OR MORE AND LESS THAN 15W | 5V |
| 15W OR MORE AND LESS THAN 27W | 9V |
| 27W OR MORE AND LESS THAN 45W | 15V |
| 45W OR MORE | 20V |

FIG. 11

1102

| GP | OUTPUT VOLTAGE TO CHARGING UNIT |
|---|---|
| 0W OR MORE AND LESS THAN 10W | 5V |
| 10W OR MORE AND LESS THAN 27W | 9V |
| 27W OR MORE AND LESS THAN 45W | 15V |
| 45W OR MORE | 20V |

POWER TRANSMITTING APPARATUS, POWER RECEIVING APPARATUS, CONTROL METHOD, AND STORAGE MEDIUM

CROSS-REFERENCE TO RELATED APPLICATIONS

This application is a Continuation of International Patent Application No. PCT/JP2021/017611, filed May 10, 2021, which claims the benefit of Japanese Patent Application No. 2020-089936, filed May 22, 2020, both of which are hereby incorporated by reference herein in their entireties.

BACKGROUND

Field

The present disclosure relates to a power transmitting apparatus, a power receiving apparatus, a control method, and a storage medium associated with wireless power transmission.

Background Art

In recent years, techniques for wireless power transmitting systems, such as wireless charging systems, have been developed widely. PTL 1 describes a power transmitting apparatus and a power receiving apparatus that comply with the standards developed by the Wireless Power Consortium (WPC), an organization for standardizing wireless charging (hereinafter referred to as "WPC standards"). Also, PTL 1 describes calibration processing defined by the WPC standards, which is intended to increase the accuracy of detection of a conductive object (foreign object), such as a metallic piece.

In calibration processing, received power in a power receiving apparatus and a power loss at that time are acquired in each of two different states. A power loss is derived as the difference between transmission power in a power transmitting apparatus and received power in a power receiving apparatus. Then, by using the pairs of the received power and the power loss in these two states as parameters, an expected power loss is derived with respect to received power notified from the power receiving apparatus in wireless power transmission. In a case where the difference between the actual power loss and the expected power loss exceeds a predetermined value, it can be determined that there has been a power loss attributed to a foreign object, that is to say, a foreign object exists.

Meanwhile, Universal Serial Bus Power Delivery (USB PD) is becoming widespread as a standard for providing power that is intended to, for example, fast-charge a battery by wire. According to USB PD, control is performed so that, if the power provided to a load increases, the voltage output to the load is increased accordingly. In this way, even if the provided power increases, the current is kept low; thus, the loss and heat generation in circuits are suppressed, and power can be provided to the load while maintaining high efficiency.

In a case where an input voltage to a power transmitting unit including a power transmitting coil is changed in order to change transmission power in a power transmitting apparatus for wireless power transmission, the power loss in a power receiving apparatus in each state changes before and after the input voltage is changed. Therefore, if detection of a foreign object is attempted in the state after the input voltage is changed while using a pair of received power and a power loss acquired in the state before the input voltage to the power transmitting unit is changed as parameters, the accuracy of detection of the foreign object decreases.

CITATION LIST

Patent Literature

PTL1: Japanese Patent Laid-Open No. 2017-070074

SUMMARY

The present disclosure provides a technique to suppress a decrease in the accuracy of detection processing for detecting an object different from a power receiving apparatus, even if the input voltage to a power transmitting unit has been changed in a power transmitting apparatus.

According to one aspect of the present disclosure, there is provided a power transmitting apparatus, comprising: a power transmitting unit configured to wirelessly transmit power to a power receiving apparatus; an applying unit configured to apply power for power transmission to the power transmitting unit; and a processing unit configured to perform detection processing for detecting an object different from the power receiving apparatus, the processing unit performing processing for a parameter used in the detection processing based on a voltage change of a voltage applied to the power transmitting unit.

According to another aspect of the present disclosure, there is provided a power receiving apparatus, comprising: a power receiving unit configured to wirelessly receive power from a power transmitting apparatus that performs detection processing for detecting an object different from the power receiving apparatus; and a power transmitting unit configured to transmit a received power value to the power transmitting apparatus in accordance with reception of a request for transmission of the received power value from the power transmitting apparatus, the received power value being used in calculation of a parameter used in the detection processing.

Further features of the present disclosure will become apparent from the following description of exemplary embodiments with reference to the attached drawings.

BRIEF DESCRIPTION OF THE DRAWINGS

The attached drawings are included in and constitute a part of the specification, illustrate embodiments of the present disclosure, and are used together with the description thereof to explain the principle of the present disclosure.

FIG. 8 is a diagram showing examples of the contents of parameters for foreign object detection processing.

FIG. 10 is a diagram showing an example of a table describing a relationship between GP and an output voltage to a power transmitting unit according to the first embodiment, and an example of a table describing a relationship between GP and an input voltage to a charging unit according to the first embodiment.

FIG. 11 is a diagram showing an example of a table describing a relationship between GP and an input voltage to the charging unit according to a second embodiment.

DESCRIPTION OF THE EMBODIMENTS

The following describes embodiments of the present disclosure with reference to the drawings. Note that the following embodiments are merely examples for describing the technical ideas of the present disclosure, and are not intended to limit the present disclosure to the configurations and methods described in the embodiments.

First Embodiment (System Configuration)

Figure 1:
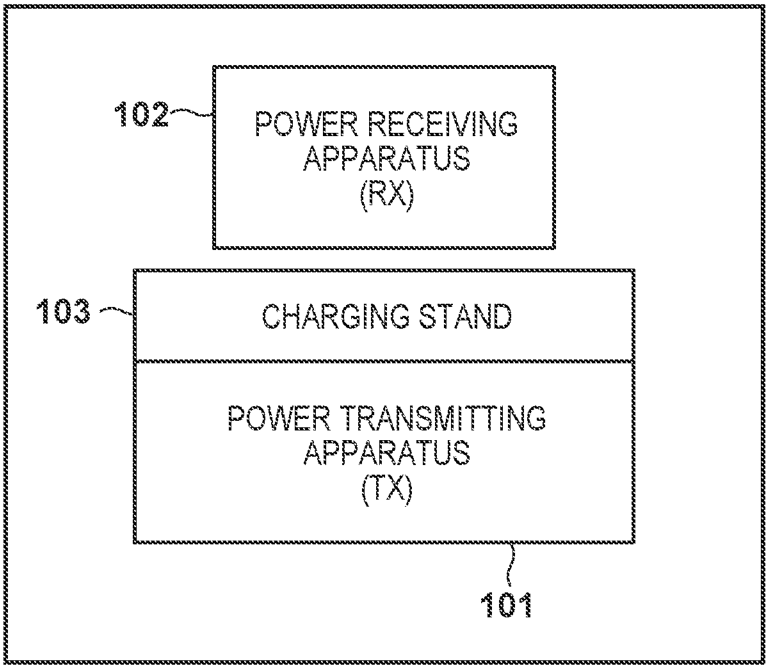
FIG. 1 is a diagram showing an exemplary configuration of a wireless charging system.

FIG. 1 shows an exemplary configuration of a wireless charging system (a wireless power transmitting system) according to the present embodiment. The present system is configured to include a power transmitting apparatus 101 and a power receiving apparatus 102. Below, the power transmitting apparatus may be referred to as a TX, and the power receiving apparatus may be referred to as an RX. The TX 101 is an electronic device that transmits power wirelessly to the RX 102 placed on a charging stand 103. The RX 102 is an electronic device that receives power wirelessly transmitted from the TX 101, and charges an internal battery. The following description is provided using an exemplary case where the RX 102 is placed on the charging stand 103.

Note, it is sufficient that the RX 102 be present in the range in which the TX 101 can transmit power during power transmission from the TX 101 to the RX 102, and the RX 102 need not necessarily be placed on the charging stand 103.

Also note, the TX 101 and the RX 102 can each have a function of executing applications other than wireless charging. One example of the RX 102 is a mobile information device that operates on a rechargeable battery, such as a laptop PC (Personal Computer), a tablet PC, and a smartphone. Also, one example of the TX 101 is an accessory device for charging that mobile information device. Note that the TX 101 and the RX 102 may be a storage apparatus such as a hard disk apparatus and a memory apparatus, and may be an information processing apparatus such as a personal computer (PC). Also, the TX 101 and the RX 102 may be, for example, an image input apparatus such as an image capturing apparatus (e.g., a camera or a video camera) and a scanner, or may be an image output apparatus such as a printer, a copier, and a projector. Furthermore, the TX 101 may be a mobile information device. In this case, the RX 102 may be another mobile information device, or may be wireless earphones. Also, the RX 102 may be an automobile. Furthermore, the TX 101 may be a charger installed in, for example, a console inside an automobile.

Also, in the present disclosure, a foreign object is a conductive object, such as a metallic piece. However, among objects of components that are indispensable for the RX 102 and a product in which the RX 102 is built, or for the TX 101 and a product in which the TX 101 is built, an object that has a possibility of generating heat in an unintended manner when subjected to power wirelessly transmitted from a power transmitting coil is not treated as a foreign object. Note that in the present disclosure, a foreign object may be a power receiving apparatus different from the RX 102 to which power is transmitted.

Also, although one TX 101 and one RX 102 are shown in the wireless charging system of the present embodiment, the present disclosure is not limited to this. The present disclosure is also applicable to, for example, a configuration in which a plurality of RXs 102 receive power transmitted from one TX 101 or discrete TXs 101.

The present system performs wireless power transmission that uses an electromagnetic induction method for wireless charging based on the Wireless Power Consortium standards (hereinafter, the WPC standards). That is to say, the TX 101 and the RX 102 perform wireless power transmission for wireless charging based on the WPC standards between a power transmitting coil of the TX 101 and a power receiving coil of the RX 102. Note that a wireless power transmission method (a contactless power transmission method) applied to the present system is not limited to the methods defined by the WPC standards, and may be other methods such as an electromagnetic induction method, a magnetic resonance method, an electric field resonance method, a microwave method, and a method that uses laser and the like. Also, although it is assumed in the present embodiment that wireless power transmission is used in wireless charging, wireless power transmission may be performed for purposes other than wireless charging.

According to the WPC standards, the magnitude of power that is guaranteed when the RX 102 receives power from the TX 101 is defined by a value called Guaranteed Power (hereinafter referred to as "GP"). GP represents a power value that is guaranteed in relation to the output to a load (e.g., a circuit for charging and the like) of the RX 102 even if the efficiency of power transmission between the power receiving coil and the power transmitting coil has decreased due to, for example, variations in the positional relationship between the TX 101 and the RX 102. For example, in a case where GP is 5 watts, even if the efficiency of power transmission has decreased due to variations in the positional relationship between the power receiving coil and the power transmitting coil, the TX 101 controls power transmission so that 5 watts can be output to a load inside the RX 102.

The TX 101 and the RX 102 according to the present embodiment perform communication for power transmission/reception control based on the WPC standards. The WPC standards define a plurality of phases including a Power Transfer Phase in which power transmission is executed, and phases prior to the execution of power transmission, and communication for power transmission/reception control is performed in each phase. The phases prior to power transmission include a Selection Phase, a Ping Phase, an Identification and Configuration Phase, a Negotiation Phase, and a Calibration Phase. Note that the Identification and Configuration Phase is hereinafter referred to as an I&C Phase.

In the Selection Phase, the TX 101 transmits an Analog Ping in an intermittent and repeated manner, and detects that an object has been placed on the charging stand 103 (e.g., the RX 102, a conductor strip, or the like has been placed on the charging stand 103). The Analog Ping is a detection signal for detecting the existence of an object. The TX 101 transmits the Analog Ping by applying a voltage or current to the power transmitting coil. When a state where no object is placed on the charging stand 103 changes into a state where an object is placed thereon, the voltage or current applied to the power transmitting coil changes. The TX 101 detects at least one of the voltage value and the current value of the power transmitting coil at the time of transmission of the Analog Ping, and determines that an object exists and makes a transition to the Ping Phase in a case where the voltage value falls below a certain threshold, or in a case where the current value exceeds a certain threshold.

In the Ping Phase, the TX 101 transmits a Digital Ping, which is higher in power than an Analog Ping. Power of the Digital Ping is power that is sufficient to activate a control unit of the RX 102 placed on the charging stand 103. The RX 102 notifies the TX 101 of the magnitude of the received voltage. In the present embodiment, the RX 102 transmits a Signal Strength Packet (hereinafter referred to as an "SS Packet") to the TX 101. The TX 101 recognizes that the object detected in the Selection Phase is the RX 102 by receiving a response (an SS Packet) from the RX 102 that has received the Digital Ping transmitted by itself. Upon receiving the notification about the received voltage value, the TX 101 makes a transition to the I&C Phase.

In the I&C Phase, the TX 101 identifies the RX 102, and acquires device configuration information (capability information) from the RX 102. Thus, the RX 102 transmits an Identification Packet (ID Packet) and a Configuration Packet to the TX 101. The ID Packet includes identification information of the RX 102, and the Configuration Packet includes device configuration information (capability information) of the RX 102. The TX 101 that has received the ID Packet and the Configuration Packet makes a response via an acknowledgement (ACK). Then, the I&C Phase ends. In the following Negotiation Phase, the value of GP is determined based on, for example, the value of GP requested by the RX 102 and the power transmission capability of the TX 101.

In the Calibration Phase, the RX 102 notifies the TX 101 of the received power with use of a Received Power Packet. At this time, the RX 102 provides a notification about at least two different received powers. For example, the RX 102 provides a notification about two received powers, namely, the received power in a state where a load is not connected, as well as the received power in a state where a load is connected and power close to the value of GP is received. Along with this, the TX 101 acquires its own transmission powers at the times of reception of respective notifications about these received powers, derives power losses from the differences between the transmission powers and the received powers, and stores the power losses in association with the received powers. In the following Power Transfer Phase, the TX 101 executes foreign object detection processing for detecting a foreign object other than the power receiving apparatus while using the pairs of the received power and the power loss that have been stored in the foregoing manner as parameters.

A description is now given of a method of executing the foreign object detection processing in the TX 101 while using the two pairs of the received power and the power loss as parameters. The TX 101 stores the two pairs of the received power and the power loss via communication in the Calibration Phase. It is assumed that, among these two pairs, one pair is "received power=RP1, power loss=PL1," and the other pair is "received power=RP2, power loss=PL2".

In executing the foreign object detection processing in the Power Transfer Phase, the TX 101 first acquires the current received power=$P_{received}$ from the RX 102. Subsequently, the TX 101 derives an expected value $PL_{cal}$ of the power loss at this time through linear complementation between the two points (RP1, PL1) and (RP2, PL2). Note, it is assumed that RP1<RP2. Specifically, the expected value can be derived using the following expression 1.

$$PL_{cal}=(PL2-PL1)/(RP2-RP1)\cdot(P_{received}-RP1)+PL1 \quad \text{[Expression 1]}$$

Here, using the following expression 2, the current power loss PL can be derived from the current transmission power $P_{transmitted}$ in the TX 101 and the received power=$P_{received}$ notified from the RX 102. In a case where the current power loss PL exceeds the expected value $PL_{cal}$ by a predetermined value, the TX 101 determines that the power loss has increased as a result of consumption of power by a foreign object value, that is to say, a foreign object has been detected.

$$PL=P_{transmitted}-P_{received} \quad \text{[Expression 2]}$$

According to the foregoing method, the expected value of the current power loss is derived through linear complementation while using the values of power losses that have been acquired in advance as parameters. This is expressed as calibration of power losses. Note that the targets of calibration may be, for example, received powers of the RX 102, or may be transmission powers of the TX 101, in place of power losses of the RX 102. Also, the method of deriving the expected value of the power loss, that is to say, the method of performing calibration is not limited to linear complementation, and may be, for example, nonlinear complementation that uses a power series and the like. Furthermore, information of three pairs or more (e.g., pairs of received power and transmission power) may be used as parameters. An example in which information of three pairs or more is used as parameters is linear complementation of a polygonal line connecting (RP1, PL1) and (RP2, PL2), and (RP2, PL2) and (RP3, PL3). Here, (RP3, PL3) is information of the third pair of received power and power loss, and RP2<RP3.

In the Power Transfer Phase, control for starting and continuing power transmission, stopping power transmission due to detection of a foreign object or a fully charged state, and the like is performed. In the present embodiment, processing for changing GP, changing of the power transmission voltage of the power transmitting apparatus, changing of the output voltage to a load of the power receiving apparatus, and processing for requesting reacquisition and addition of parameters for foreign object detection processing, are further executed in the Power Transfer Phase. The details of such processing will be described later.

The TX 101 and the RX 102 perform the foregoing communication for power transmission/reception control, which is based on the WPC standards, by way of communication in which signals are superimposed on transmission power with use of the same antennas (coils) as wireless power transmission. Note that the TX 101 and the RX 102 may perform communication for power transmission/reception control with use of antennas (coils) different from those for wireless power transmission. Examples of communication that uses antennas (coils) different from those for wireless power transmission include a communication method that complies with the Bluetooth® Low Energy standard. Furthermore, the communication may be performed based on other communication methods such as a wireless LAN of the IEEE 802.11 standard series (e.g., Wi-Fi®), ZigBee, and NFC (Near Field Communication). Communication that uses antennas (coils) different from those for wireless power transmission may be performed at frequencies different from frequencies used in wireless power transmission.

(Apparatus Configurations)

Subsequently, a description is given of the configurations of the power transmitting apparatus 101 (TX 101) and the power receiving apparatus 102 (RX 102) according to the present embodiment. Note that the configurations described below are merely examples; a part (or an entirety, depending on circumstances) of the described configurations may be replaced with other configurations that achieve other similar functions, or omitted, and further configurations may be added to the configurations described below. Furthermore, one block mentioned in the following description may be divided into a plurality of blocks, and a plurality of blocks may be integrated into one block.

Figure 2:
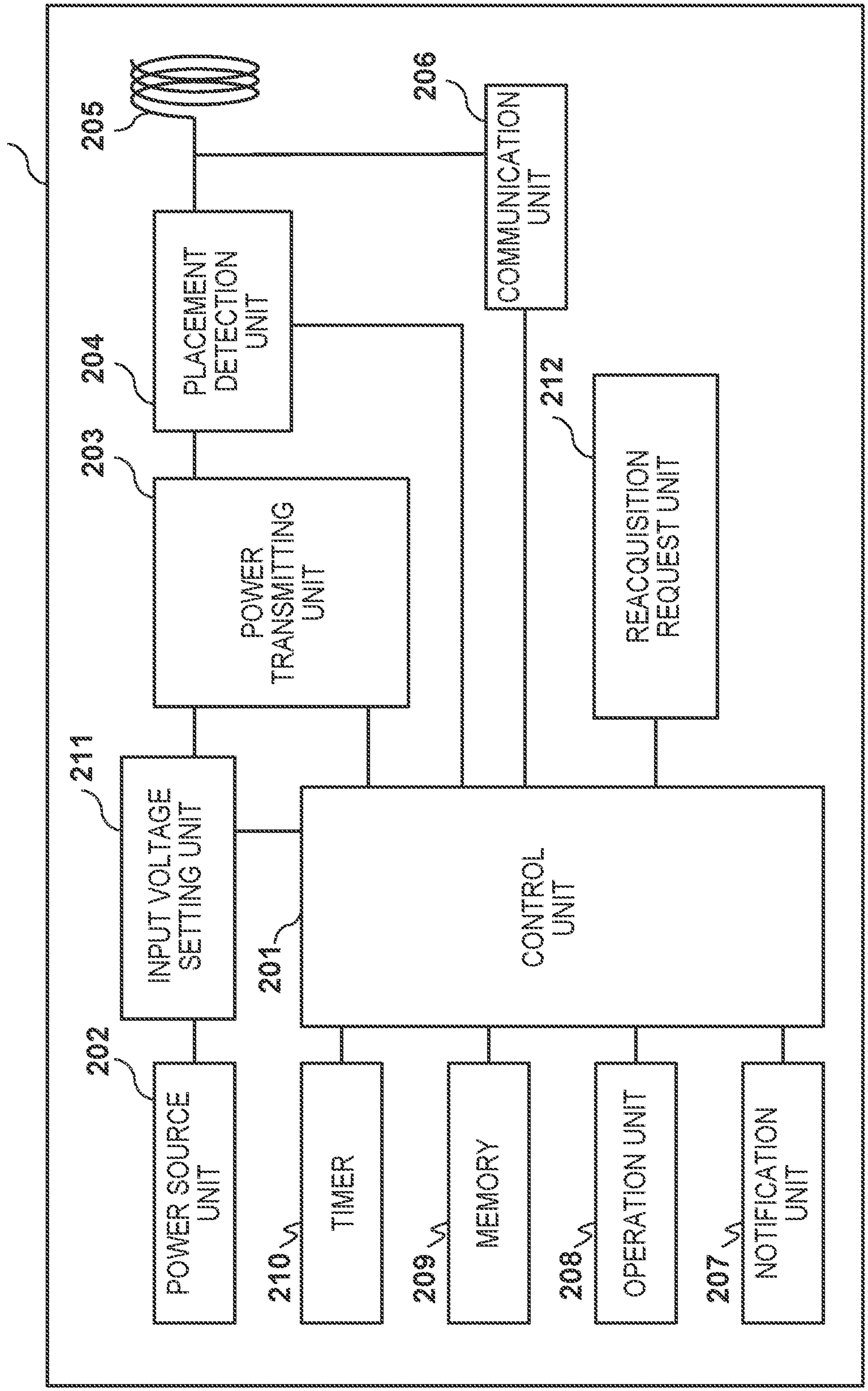
FIG. 2 is a block diagram showing an exemplary configuration of a power transmitting apparatus according to a first embodiment.

FIG. 2 is a block diagram showing an exemplary configuration of the TX 101 according to the present embodiment. In one example, the TX 101 includes a control unit 201, a power source unit 202, a power transmitting unit 203, a placement detection unit 204, a power transmitting coil 205, a communication unit 206, a notification unit 207, an operation unit 208, a memory 209, a timer 210, an input voltage setting unit 211, and a reacquisition request unit 212.

The control unit 201 controls the entirety of the TX 101 by executing a control program stored in, for example, the memory 209. That is to say, the control unit 201 controls each function unit shown in FIG. 2. Also, the control unit 201 performs control related to power transmission control in the TX 101. The control unit 201 may further perform control for executing applications other than wireless power transmission. The control unit 201 is configured to include one or more processors, such as CPUs, MPUs, and the like. Note that the control unit 201 may be configured to include hardware dedicated to specific processing, such as an Application Specific Integrated Circuit (ASIC), or an array circuit compiled to execute predetermined processing, such as an FPGA. The control unit 201 stores, in the memory 209, information to be stored during the execution of various types of processing. Furthermore, the control unit 201 can measure a time period with use of the timer 210.

The power source unit 202 provides the entirety of the TX 101 with power necessary for the control unit 201 to control the TX 101, and for power transmission and communication. The power source unit 202 is, for example, a commercial power supply or a battery. The battery stores power provided from a commercial power supply.

The power transmitting unit 203 converts direct-current or alternating-current power input from the power source unit 202 into alternating-current frequency power of a frequency band used in wireless power transmission, and inputs this alternating-current frequency power to the power transmitting coil 205; as a result, electromagnetic waves for causing the RX 102 to receive power are generated. Note that the frequency of alternating-current power generated by the power transmitting unit 203 is, for example, approximately several hundred kHz (e.g., 110 kHz to 205 kHz). Based on an instruction from the control unit 201, the power transmitting unit 203 inputs alternating-current frequency power to the power transmitting coil 205 so as to cause the power transmitting coil 205 to output electromagnetic waves for transmitting power to the RX 102. Also, the power transmitting unit 203 controls the intensity of electromagnetic waves to be output by adjusting one or both of the voltage (power transmission voltage) and the current (power transmission current) to be input to the power transmitting coil 205. Increasing the power transmission voltage or the power transmission current enhances the intensity of electromagnetic waves, whereas reducing the power transmission voltage or the power transmission current weakens the intensity of electromagnetic waves. Furthermore, based on an instruction from the control unit 201, the power transmitting unit 203 performs output control with respect to the alternating-current frequency power so that power transmission from the power transmitting coil 205 is started or stopped. In addition, the power transmitting unit 203 notifies the control unit 201 of the current transmission power. In this way, the control unit 201 can learn the current transmission power at any timing. Note that it is permissible to adopt a configuration in which an entity other than the power transmitting unit 203 measures transmission power and provides a notification to the control unit 201.

The placement detection unit 204 detects whether an object is placed on the charging stand 103 based on the WPC standards. Specifically, the placement detection unit 204 detects whether an object has been placed on an Interface Surface of the charging stand 103. The placement detection unit 204 detects at least one of the voltage value and the current value of the power transmitting coil 205 at the time when, for example, the power transmitting unit 203 transmitted an Analog Ping of the WPC standards via the power transmitting coil 205. Note that the placement detection unit 204 may detect a change in impedance. Then, the placement detection unit 204 can determine that an object is placed on the charging stand 103 in a case where the voltage falls below a predetermined voltage value, or in a case where the current value exceeds a predetermined current value. Note that whether this object is the power receiving apparatus or another foreign object is determined based on whether there is a predetermined response from the RX 102 to a Digital Ping that is subsequently transmitted by the communication unit 206. That is to say, in a case where the TX 101 has received the predetermined response, this object is determined to be the power receiving apparatus (RX 102); otherwise, this object is determined to be an object different from the power receiving apparatus.

The communication unit 206 performs the aforementioned control communication based on the WPC standards with the RX 102. The communication unit 206 performs communication by modulating electromagnetic waves output from the power transmitting coil 205 and transmitting information to the RX 102. Also, the communication unit 206 acquires information transmitted by the RX 102 by demodulating electromagnetic waves that have been output from the power transmitting coil 205 and modulated by the RX 102. That is to say, the communication unit 206 performs communication by way of superimposition on electromagnetic waves transmitted from the power transmitting coil 205.

The notification unit 207 notifies a user of information with use of any visual, auditory, or haptic method, for example. The notification unit 207 notifies the user of, for example, a charged state of the TX 101, and a state related to power transmission of the wireless power transmitting system including the TX 101 and the RX 102 shown in FIG. 1. The notification unit 207 is configured to include, for example, a liquid crystal display, an LED, a speaker, a vibration generation circuit, and other notification devices.

The operation unit 208 has an acceptance function for accepting an operation that has been performed by the user with respect to the TX 101. The operation unit 208 is configured to include, for example, buttons, a keyboard, a sound input device such as a microphone, a motion detection device such as an acceleration sensor and a gyroscope, or other input devices. Note that a device in which the notification unit 207 and the operation unit 208 are integrated, such as a touchscreen, may be used.

The memory 209 stores various types of information such as identification information and capability information, a control program, and the like. Note that the memory 209 may store information that has been acquired by a function unit different from the control unit 201. The timer 210 measures time with use of, for example, a count-up timer that measures a time period elapsed since the time of activation, a count-down timer that counts down from a set time, and the like. Under control of the control unit 201, the input voltage setting unit 211 sets an input voltage for providing power from the power source unit 202 to the power transmitting unit 203. The input voltage setting unit 211 includes a variable voltage unit.

Using the communication unit 206, the reacquisition request unit 212 requests the RX 102 to reacquire parameters for foreign object detection processing. Parameters for foreign object detection processing denote one or more pairs of received power and a power loss, which have been mentioned in the earlier description of the Calibration Phase. Note that the reacquisition request unit 212 may be configured to entirely or partially operate on a processor different from that of the control unit 201, and may be implemented by a program that operates on the control unit 201. The functions of the reacquisition request unit 212 can be achieved by executing a program stored in, for example, the memory 209.

Here, the power source unit 202 and the input voltage setting unit 211 may exist as other devices outside the TX 101. Examples of these external devices include a power supply adapter that provides power based on the USB PD standard. In this case, the control unit 201 may control the input voltage setting unit 211 via communication of the USB PD standard.

Figure 3:
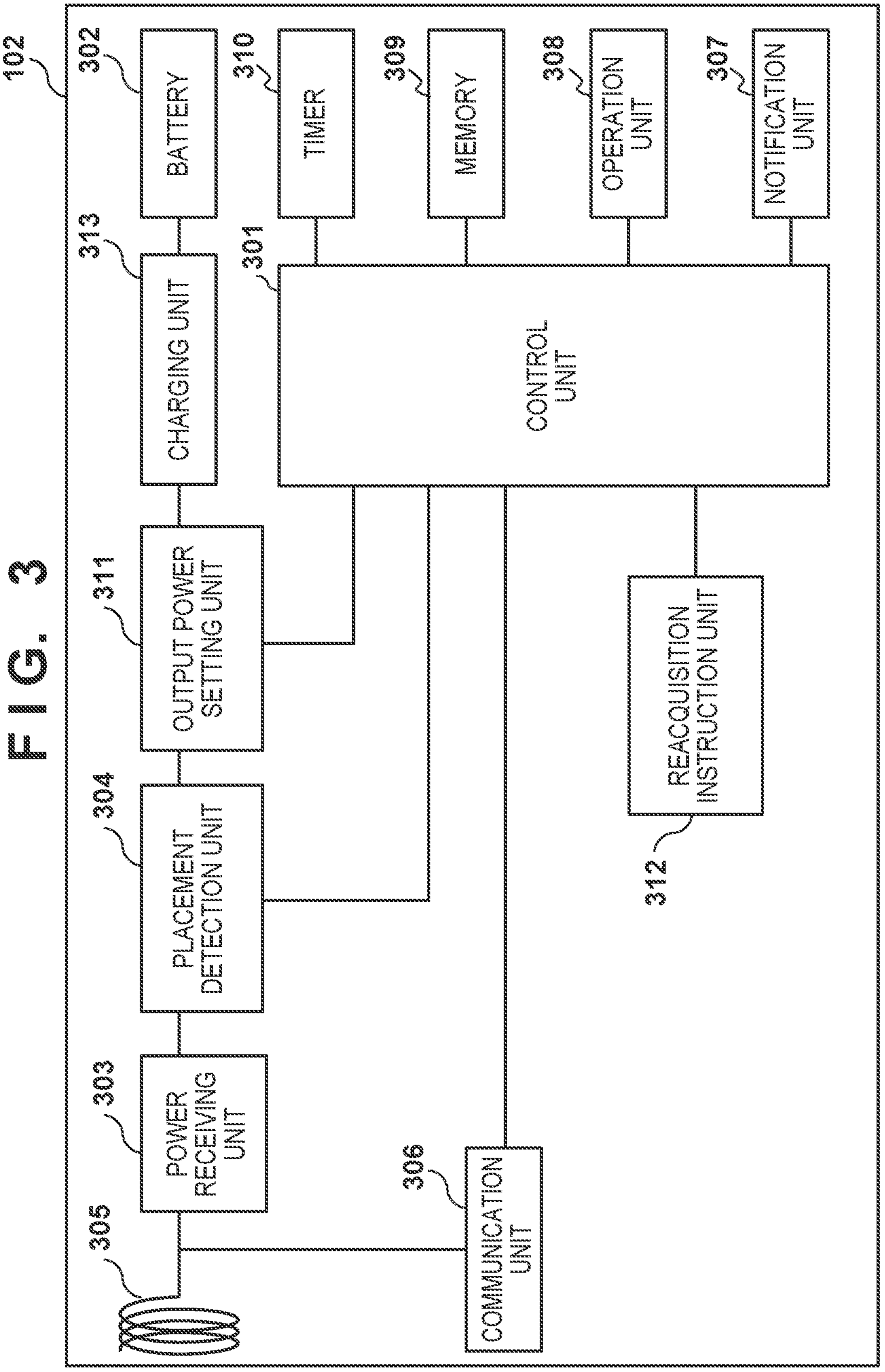
FIG. 3 is a block diagram showing an exemplary configuration of a power receiving apparatus according to the first embodiment.

FIG. 3 is a block diagram showing an exemplary configuration of the RX 102 according to the present embodiment. The RX 102 includes a control unit 301, a battery 302, a power receiving unit 303, a placement detection unit 304, a power receiving coil 305, a communication unit 306, a notification unit 307, an operation unit 308, a memory 309, and a timer 310. The RX 102 also includes an output power setting unit 311, a reacquisition instruction unit 312, and a charging unit 313.

The control unit 301 controls the entirety of the RX 102 by executing a control program stored in, for example, the memory 309. That is to say, the control unit 301 controls each function unit shown in FIG. 3. Also, the control unit 301 performs control related to power reception control in the RX 102. The control unit 301 may further perform control for executing applications other than wireless power transmission. The control unit 301 is configured to include one or more processors, such as CPUs (Central Processing Units), MPUs (Micro Processing Units), and the like. Note that the control unit 301 may be composed of hardware dedicated to specific processing, such as an Application Specific Integrated Circuit (ASIC). Also, the control unit 301 may be configured to include an array circuit compiled to execute predetermined processing, such as an FPGA (Field Programmable Gate Array). The control unit 301 stores, in the memory 309, information to be stored during the execution of various types of processing. Furthermore, the control unit 301 can measure a time period with use of the timer 310.

The battery 302 provides the entirety of the RX 102 with power necessary for the control unit 301 to control each unit of the RX 102, and for power reception and communication. Also, the battery 302 stores power received via the power receiving coil 305.

In the power receiving coil 305, an induced electromotive force is generated by electromagnetic waves emitted from the power transmitting coil 205 of the TX 101. The power receiving unit 303 acquires power generated in the power receiving coil 305. The power receiving unit 303 acquires alternating-current power generated by electromagnetic induction in the power receiving coil 305, converts the alternating-current power into direct-current power or alternating-current power of a predetermined frequency, and outputs the power to the charging unit 313 that performs processing for charging the battery 302. That is to say, the power receiving unit 303 provides power to a load in the RX 102, and the charging unit 313 and the battery 302 are examples of such a load. The above-described GP is power that is guaranteed to be output from the power receiving unit 303. Furthermore, the power receiving unit 303 notifies the control unit 301 of the current received power. In this way, at any timing, the control unit 301 can learn received power of this timing. Note that it is permissible to adopt a configuration in which an entity other than the power receiving unit 303 measures received power and notifies the control unit 301 of received power.

The placement detection unit 304 detects that the RX 102 is placed on the charging stand 103 based on the WPC standards. The placement detection unit 304 detects, for example, at least one of the voltage value and the current value of the power receiving coil 305 at the time when the power receiving unit 303 received a Digital Ping of the WPC standards via the power receiving coil 305. The placement detection unit 304 determines that the RX 102 is placed on the charging stand 103, for example, in a case where the voltage value falls below a predetermined voltage threshold, or in a case where the current value exceeds a predetermined current threshold.

The communication unit 306 performs the aforementioned control communication based on the WPC standards with the TX 101. The communication unit 306 performs communication with the TX 101 by acquiring information transmitted from the TX 101 by way of demodulation of electromagnetic waves input from the power receiving coil 305, and by superimposing information to be transmitted to the TX 101 on electromagnetic waves by way of load modulation of the input electromagnetic waves. That is to say, the communication unit 306 performs communication by way of superimposition on electromagnetic waves transmitted from the power transmitting coil of the TX 101.

The notification unit 307 notifies a user of information with use of any visual, auditory, or haptic method, for example. The notification unit 307 notifies the user of, for example, a charged state of the RX 102, and a state related to power transmission of the wireless power transmitting system including the TX 101 and the RX 102 shown in FIG. 1. The notification unit 307 is configured to include, for example, a liquid crystal display, an LED, a speaker, a vibration generation circuit, and other notification devices. The operation unit 308 has an acceptance function for accepting an operation that has been performed by the user with respect to the RX 102. The operation unit 308 is configured to include, for example, buttons, a keyboard, a sound input device such as a microphone, a motion detection device such as an acceleration sensor and a gyroscope, or other input devices. Note that a device in which the notification unit 307 and the operation unit 308 are integrated, such as a touchscreen, may be used. As stated earlier, the memory 309 stores various types of information such as identification information and device configuration information, a control program, and the like. Note that the memory 309 may store information that has been acquired by a function unit different from the control unit 301. The timer 310 measures time with use of, for example, a count-up timer that measures a time period elapsed since the time of activation, a count-down timer that counts down from a set time, and the like.

The charging unit 313 charges the battery 302 with use of power provided from the power receiving unit 303. Also, under control of the control unit 301, the charging unit 313 starts or stops charging of the battery 302, and further adjusts power used in charging of the battery 302 based on the charged state of the battery 302. When power used by the charging unit 313 has changed, power provided from the power receiving unit 303, that is to say, received power in the RX 102, also changes accordingly. As stated earlier, the charging unit 313 is a load in the RX 102. Note that the charging unit 313 and the battery 302 may exist as other devices outside the RX 102. These devices may be, for example, devices that operate on power provided based on the USB PD standard. In this case, the control unit 301 may acquire, from the charging unit 313, information of the magnitude of power necessitated by the charging unit 313 via communication of the USB PD standard. Under control of the control unit 301, the output power setting unit 311 sets an output voltage for providing power from the power receiving unit 303 to the charging unit 313, that is to say, a load. The output power setting unit 311 includes a variable voltage unit.

Using the communication unit 306, the reacquisition instruction unit 312 instructs the TX 101 to start reacquiring parameters for foreign object detection processing. Parameters for foreign object detection processing denote pairs of received power and a power loss, which have been mentioned in the earlier description of the Calibration Phase. Note that the reacquisition instruction unit 312 may be configured to entirely or partially operate on a processor different from that of the control unit 301, and may be implemented by a program that operates on the control unit 301. The functions of the reacquisition instruction unit 312 can be achieved by executing a program stored in, for example, the memory 309.

(Flow of Processing)

Subsequently, a description is given of exemplary flows of processing executed by the TX 101 and the RX 102.

[Processing in Power Transmitting Apparatus]

Figure 4A:
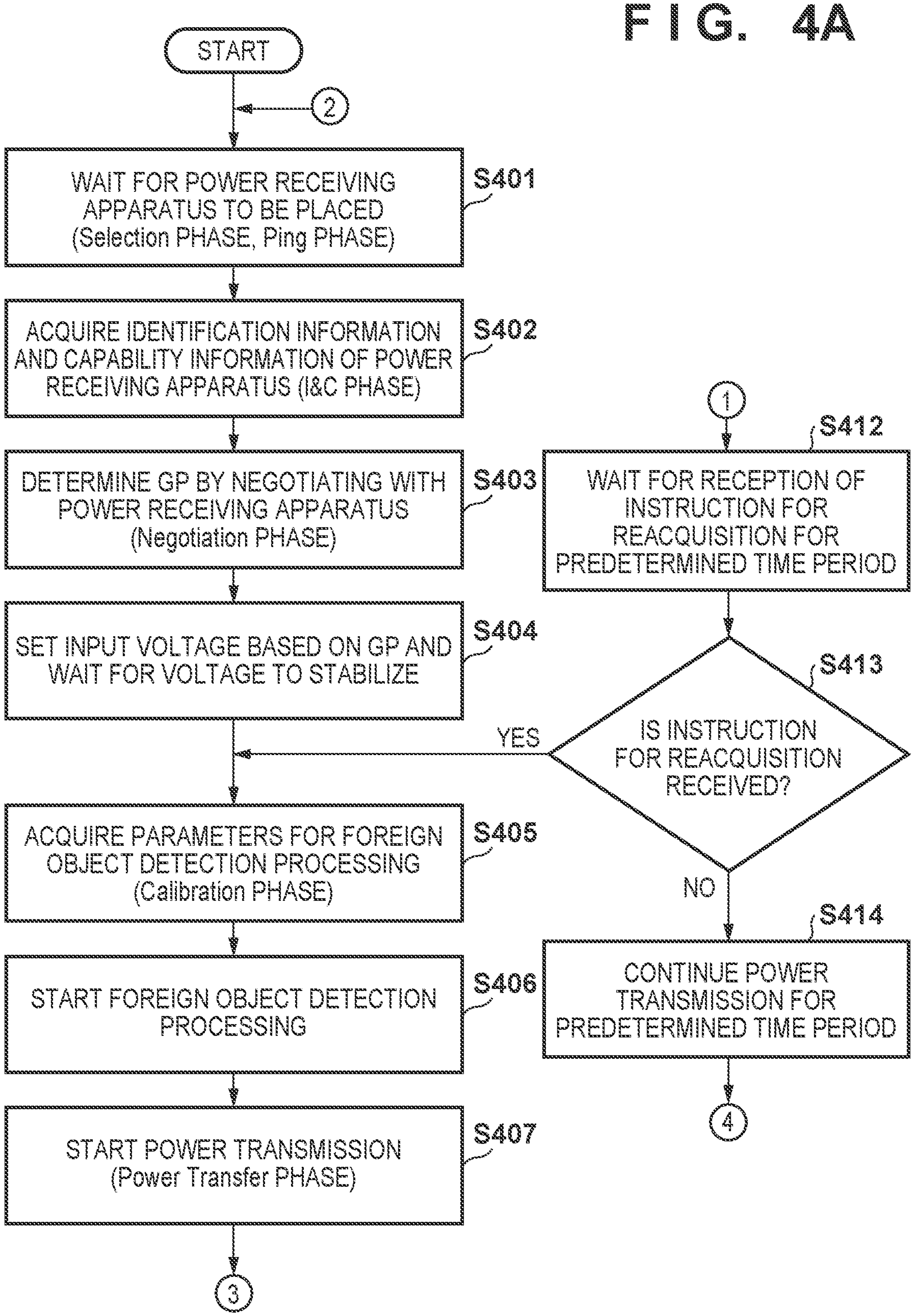
FIG. 4A is a flowchart showing an exemplary flow of processing of the power transmitting apparatus according to the first embodiment.
Figure 4B:
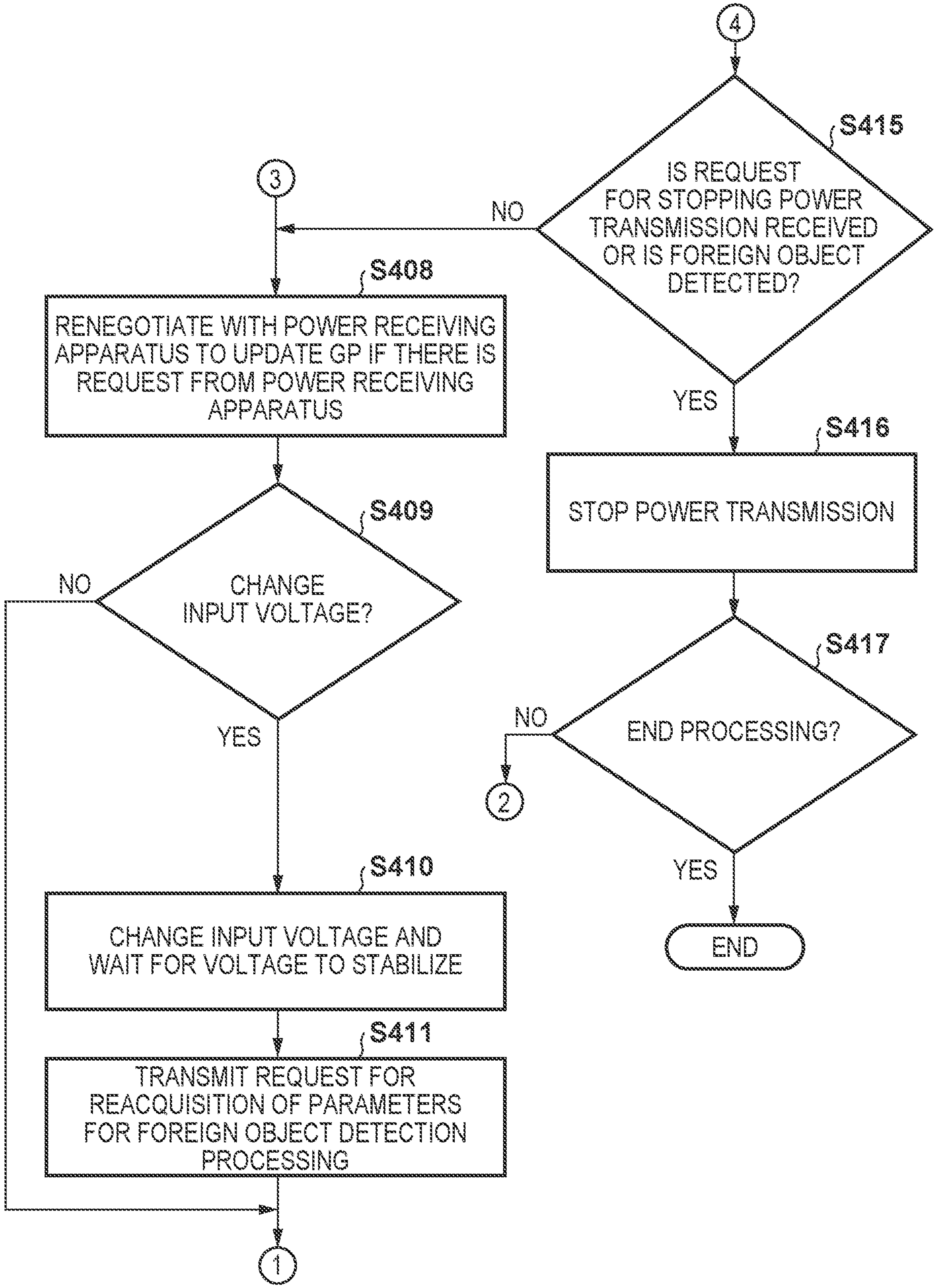
FIG. 4B is a flowchart showing an exemplary flow of processing of the power transmitting apparatus according to the first embodiment.

FIG. 4A and FIG. 4B are flowcharts showing an exemplary flow of processing executed by the TX 101. Hereinafter, FIG. 4A and FIG. 4B are collectively referred to as FIG. 4. The present processing can be realized by, for example, the control unit 201 of the TX 101 executing a program that has been read out from the memory 209. The present processing also includes processing in the reacquisition request unit 212. Note that at least a part of the following procedure may be realized by hardware. In this case, the hardware can be realized by, for example, automatically generating a dedicated circuit that uses a gate array circuit, such as an FPGA, from a program for realizing each processing step with use of a predetermined compiler. Also, the present processing can be started in response to power-ON of the TX 101, in response to an instruction for starting a wireless charging application input by a user of the TX 101, or in response to reception of provided power by the TX 101 while being connected to a commercial power supply. Note that the present processing may be started by another trigger.

In processing related to power transmission/reception, the TX 101 first executes processing defined as the Selection Phase and the Ping Phase of the WPC standards, and waits for the RX 102 to be placed (S401). Specifically, the TX 101 transmits an Analog Ping of the WPC standards in a repeated and intermittent manner, and the placement detection unit 204 detects whether there is an object placed on the charging stand 103 based on a change in the current or the voltage in the power transmitting coil 205. In a case where the placement of an object on the charging stand 103 has been detected, the TX 101 transmits a Digital Ping. Also, in a case where there has been a predetermined response (a Signal Strength Packet) to that Digital Ping, the TX 101 determines that the detected object is the RX 102 and the RX 102 has been placed on the charging stand 103. Upon detecting the placement of the RX 102, the TX 101 executes processing defined as the I&C Phase of the WPC standards, and acquires identification information and device configuration information (capability information) from this RX 102, with use of the communication unit 206 (S402).

Figure 7:
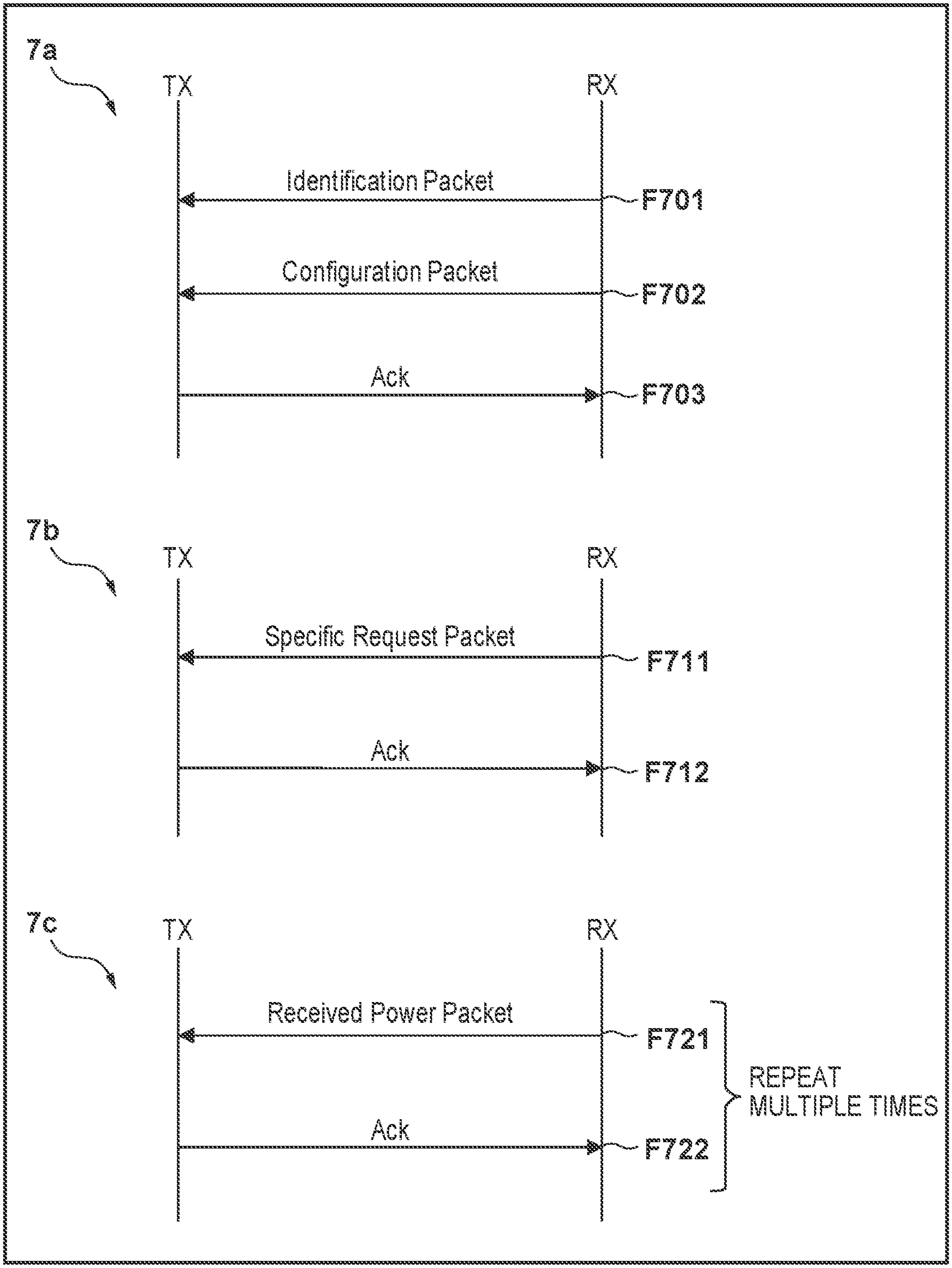
FIG. 7 is a diagram showing a communication sequence (7*a*) in an I&C Phase, a communication sequence (7*b*) in a Negotiation Phase, and a communication sequence (7*c*) in a Calibration Phase.

A communication sequence 7*a* of FIG. 7 depicts an exemplary flow of communication in the I&C Phase. In the I&C Phase, the RX 102 transmits an Identification Packet (ID Packet) to the TX 101 (F701). The ID Packet stores a Manufacturer Code and a Basic Device ID, which are identification information of the RX 102, as well as an information element that enables specification of a corresponding version of the WPC standards as capability information of the RX 102. The RX 102 further transmits a Configuration Packet to the TX 101 (F702). The Configuration Packet includes, as capability information of the RX 102, a Maximum Power Value, which is a value that specifies the maximum power that the RX 102 can provide to a load, and information indicating whether a Negotiation function of the WPC standards is provided.

Once the TX 101 has received these packets, it transmits an ACK (F703), and the I&C Phase ends. Note that the TX 101 may acquire the identification information and the device configuration information (capability information) of the RX 102 from the RX 102 using a method other than communication in the I&C Phase of the WPC standards. Also, the identification information of the RX 102 may be a Wireless Power ID of the WPC standards, or may be any other identification information that enables identification of the individuality of the RX 102. Information other than the ones described above may be included as the capability information.

Returning to FIG. 4, the TX 101 negotiates with the RX 102 and determines GP by way of communication in the Negotiation Phase (S403). A communication sequence 7*b* of FIG. 7 depicts an exemplary flow of communication in the Negotiation Phase. GP is determined based on a Specific Request Packet from the RX 102, and on a response thereto from the TX 101. First, the RX 102 notifies the TX 101 of the value of requested GP by transmitting a Specific Request Packet thereto (F711). The RX 102 determines the value of requested GP based on the power necessitated by itself. In the present embodiment, the value of GP requested at this stage is, for example, 5 watts.

The TX 101 determines whether to accept the request from the RX 102 based on the power transmission capability of itself, and transmits an ACK (affirmation response) to the RX 102 in a case where the request is to be accepted, and a NAK (negation response) thereto in a case where the request is not to be accepted. Note that FIG. 7 (B) depicts an example in which the TX 101 transmits an ACK (F712). In a case where the TX 101 has transmitted an ACK, the value of GP is determined to be the same as the value requested by the RX 102, and is stored in the memories of both of the TX 101 and the RX 102. On the other hand, in a case where the TX 101 has transmitted a NAK, the value of GP is a small default value, for example, a value equal to or smaller than 5 watts. In one example, the default value is stored in the memories of both of the TX 101 and the RX 102 in advance. Note that the foregoing method of determining GP is one example, and GP may be determined using another method.

Returning to FIG. 4, the input voltage setting unit 211 of the TX 101 determines the input voltage for providing power from the power source unit 202 to the power transmitting unit 203 based on GP determined in S403, and sets the input voltage on the power transmitting unit 203 (S404). Note that this processing also includes processing for, after the input voltage setting unit 211 has set the input voltage on the power transmitting unit 203, waiting for this voltage to be stably input to the power transmitting unit 203. Table 1001 of FIG. 10 shows examples of the input voltage determined based on GP. By referring to table 1001, the input voltage setting unit 211 can set, for example, an input voltage of 5 vols for a case where determined GP is 5 watts, an input voltage of 9 volts for a case where determined GP is 15 watts, and so on. Here, each value of table 1001 is a value of an input voltage that has been determined in advance based on the electrical properties of the power transmitting unit 203 of the TX 101 in order to efficiently transmit the determined power, and is held in, for example, the memory 209. Note that in a case where the power source unit 202 and the input voltage setting unit 211 are external devices that operate based on the USB PD standard, the input voltage setting unit 211 may acquire the values in table 1001 from the control unit 201 via communication. Alternatively, table 1001 may be held in the memory 209 as a table prescribed by the USB PD standard.

Returning to FIG. 4, after the input voltage has been set, the TX 101 acquires parameters for foreign object detection processing through processing in the Calibration Phase (S405). A communication sequence 7*c* of FIG. 7 depicts an exemplary flow of communication in the Calibration Phase. The RX 102 transmits a Received Power Packet via the communication unit 306 (F721). The Received Power Packet includes a Received Power Value that indicates the current received power. The TX 101 stores information of the received power included in the Received Power Packet as parameters for foreign object detection processing, and then returns an ACK (F722). As will be described below, F721 and F722 are repeated at least twice.

For example, the RX 102 provides notifications about received powers in two different states: a state where a load is not connected, that is to say, a state close to 0 watts, and a state where a load is connected and power close to the value of GP is being received. To provide these notifications, communication of the Received Power Packet and the ACK takes place twice, and information of two received powers is stored in the TX 101. Note that it is permissible to provide a notification about an intermediate received power between the state close to 0 watts and the state where power of a value close to GP is being received, in addition to the foregoing notifications. It is assumed in the present embodiment that, in a case where the value of GP exceeds 5 watts, a notification about received power is provided at a power value interval of approximately 5 watts. For example, in a case where the value of GP is 15 watts, the notification about received power is provided in the states where four types of powers, namely approximately 0 watts, approximately 5 watts, approximately 10 watts, and approximately 15 watts, are received. Note that the power value interval may not be constant, and may not be 5 watts. The TX 101 stores, into the memory 209, all of the received powers of which it was notified as parameters for foreign object detection processing.

Also, the RX 102 adds, to the first Received Power Packet after the Calibration Phase was started, information to that effect. Specifically, the value of Mode included in the Received Power Packet is set at 1. Furthermore, with regard to the second and subsequent Received Power Packets in that Calibration Phase, the value of Mode is set at a value other than 1, for example, 2. In this way, the TX 101 can identify the beginning of a Calibration Phase based on the value of Mode. Note that the above-described method of identifying the beginning of a Calibration Phase is an example; Mode may take other values, and the identification may be performed based on a value other than Mode. Also, the beginning may be identified based on another packet.

Once the TX 101 has identified the beginning of a Calibration Phase by receiving a Received Power Packet with a Mode value of 1, it discards parameters for foreign object detection processing that have already been stored in the memory 209. Then, the TX 101 stores the received power included in the Received Power Packet received from the RX 102 and the power loss indicating the difference from the transmission power in the power transmitting unit 203 at that time, in association with each other, into the memory 209. Note that the transmission power, in place of the power loss, may be stored in association with the received power, or both of the power loss and the transmission power may be stored in association with the received power. Thereafter, when the TX 101 has received a Received Power Packet with a Mode value of 2, the TX 101 additionally stores the received power included in this packet and the power loss at that time, in association with each other, into the memory 209.

Table 800 of FIG. 8 shows one example of the contents of parameters for foreign object detection processing stored in the memory 209. For example, information in row 801 indicates that the power loss is 0.6 watts when the received power in the RX 102 is 0.1 watts, and was stored upon reception of a Received Power Packet (Mode=1) from the RX 102. Thereafter, each time a Received Power Packet (Mode=2) is received from the RX 102, the TX 101 adds a row in table 800 (e.g., row 802). Note that as stated earlier, in a case where a Received Power Packet with Mode=1 has been received, the TX 101 clears the contents up until that point, and then stores rows again, starting from row 801.

Returning to FIG. 4, the TX 101 starts foreign object detection processing and power transmission (S406, S407). The foreign object detection processing in the TX 101 is executed as follows. First, the TX 101 regularly acquires information of the current received power from the RX 102. A notification about received power from the RX 102, which is for foreign object detection processing, is provided via, for example, a Received Power Packet with a Mode value of 0. In a case where the TX 101 has received a Received Power Packet (Mode=0), it does not update parameters for foreign object detection processing (table 800). Then, the TX 101 derives the expected value of the power loss corresponding to the acquired received power by way of linear interpolation between respective points with use of parameters for foreign object detection processing in table 800 of FIG. 8. The aforementioned expression 1 can be used in linear interpolation.

The TX 101 calculates the power loss from the difference between the transmission power that was measured first after the received power was acquired (the current transmission power) and the acquired received power. Then, the TX 101 compares the difference between the calculated power loss and the expected value with a threshold. In a case where the difference between the calculated power loss and the expected value exceeds the threshold, the TX 101 determines that there is a power loss caused by a foreign object, such as a metallic piece, and determines that the foreign object exists in a power transmission range. In a case where it is determined that the foreign object exists in the power transmission range, the TX 101 restricts power transmission with use of the control unit 201. Specifically, the control unit 201 controls the power transmitting unit 203 to stop power transmission or lower the transmission power. Also, the control unit 201 may notify the RX 102 of the existence of the foreign object via the communication unit 206. Furthermore, the control unit 201 may notify the RX 102 of the restriction on the transmission power.

Figure 9:
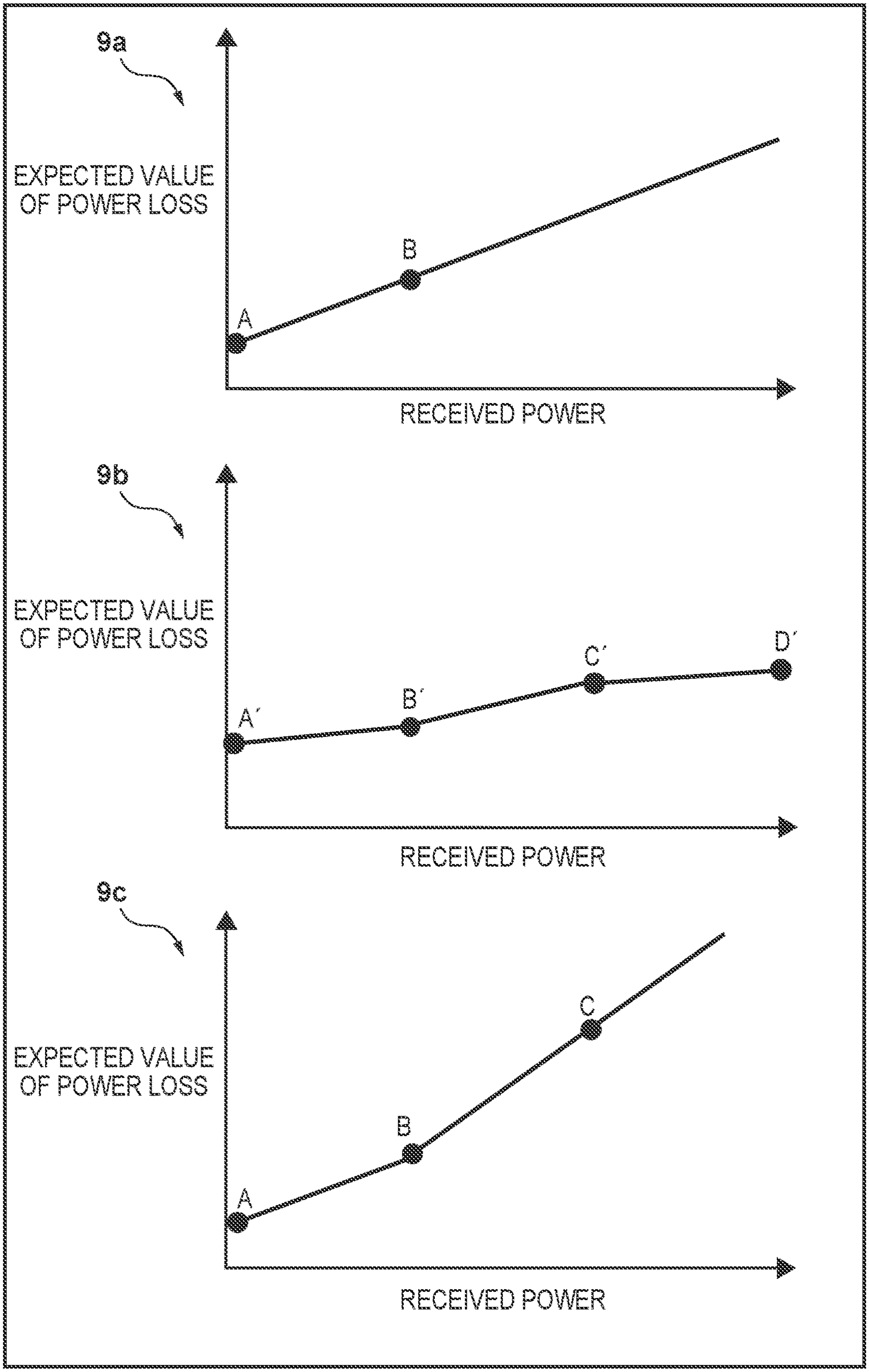
FIG. 9 is a diagram for describing linear complementation in foreign object detection processing.

The following provides a specific description of foreign object detection processing, using an exemplary case where the contents of parameters for foreign object detection processing are the contents shown in row 801 and row 802 of table 800 of FIG. 8. Point A and point B in a graph 9*a* of FIG. 9 are obtained respectively by plotting row 801 and row 802 in a diagram in which the received power and the power loss are represented by the axes. The TX 101 derives the expected value of the power loss corresponding to the current received power by way of linear complementation represented by a straight line connecting between point A and point B. For example, in a case where the value of the current received power (RP) is 2.5 watts, the numerical values of row 801 (RP1=0.1 watts, PL1=0.6 watts) and row 802 (RP1=4.9 watts, PL2=1.6 watts) are fitted to the aforementioned expression 1. In this case, the expected value PL of the power loss is 1.1 as follows.

$$PL=(1.6-0.6)/(4.9-0.1)*(2.5-0.1)+0.6=1.1$$

Then, using the transmission power that was measured first after the received power was acquired as the current transmission power, the TX 101 calculates the power loss from the difference between the current transmission power and the current received power (RP=2.5 watts). In a case where the difference between the value of the power loss calculated in the foregoing manner and the expected value (PL) of 1.1 watts exceeds a predetermined threshold, it is determined that there is a power loss caused by the foreign object, and it is determined that the foreign object exists in the power transmission range. Here, the threshold may be an absolute value, such as 1 watt, or may be a relative value, such as 50% of the expected value. Information related to this threshold is stored in the memory 209. Furthermore, the threshold may change in a stepwise manner in accordance with the received power and the expected value of the power loss.

In FIG. 4, the TX 101 accepts GP negotiation from the RX 102 also during power transmission (S408). In a case where GP has changed as a result of the negotiation, the TX 101 determines the input voltage to the power transmitting unit 203 with reference to table 1001 of FIG. 10. In a case where the current input voltage is to be changed (in a case where the determined input voltage is different from the current input voltage) (YES of S409), the input voltage setting unit 211 changes the input voltage (S410). The reacquisition request unit 212 waits for the input voltage to stabilize (S410), and then transmits a request for reacquisition of parameters for foreign object detection processing to the RX 102 (S411). On the other hand, in a case where the current input voltage is not to be changed (in a case where the determined input voltage is the same as the current input voltage) (NO of S409), processing of S410 and S411 is skipped. Subsequently, the TX 101 waits for the reception of an instruction for reacquisition of parameters for foreign object detection processing from the RX 102 for a predetermined time period (S412). Here, the purpose for waiting for the instruction for reacquisition from the RX 102 for the predetermined time period, is to provide the RX 102 that has received the reacquisition request with a time period to execute processing for transmitting the instruction for reacquisition of parameters for foreign object detection processing.

In a case where the instruction for reacquisition of parameters for foreign object detection processing has been received from the RX 102 (YES of S413), processing returns to S405, and the TX 101 reacquires parameters for foreign object detection processing through processing in the Calibration Phase. Note that whether the instruction for reacquisition has been received from the RX 102 is always monitored during power transmission of the TX 101. Then, in a case where the instruction for reacquisition has been received from the RX 102, processing proceeds from S413 to S405, and the TX 101 executes reacquisition of parameters for foreign object detection processing. That is to say, regardless of whether the input voltage has been changed or not, the TX 101 starts reacquisition of parameters for foreign object detection processing in a case where the instruction for reacquisition of parameters for foreign object detection processing has been received from the RX 102 (YES of S413). Also, processing of S412 (processing for waiting for the reception of the instruction for reacquisition) may be skipped in a case where GP is not updated in S408 and it is determined that the input voltage is not to be changed in S409. In addition, although the input voltage is changed in S409 based on the GP value determined through negotiation with the RX 102, no limitation is intended by this. For example, the control unit 201 may acquire transmission power to the RX 102, and the input voltage to the power transmitting unit 203 may be set and changed based thereon.

Furthermore, this case, too, can adopt a configuration in which the input voltage is changed based on the USB PD standard.

In a case where the instruction for reacquisition of parameters for foreign object detection processing has not been received from the RX 102 (NO of S413), power transmission is continued for a predetermined time period (S414). Here, the predetermined time period is, for example, one second. In a case where a request for stopping power transmission is not received and a foreign object is not detected during this power transmission (NO of S415), processing returns to S408, and the foregoing processing is repeated. In a case where the request for stopping power transmission has been received or a foreign object has been detected (YES of S415), the TX 101 stops power transmission (S416).

Thereafter, the TX 101 determines whether to end processing (S417). In a case where it is determined that processing is not to be ended (NO of S417), processing returns to S401, and the foregoing processing is repeated. In a case where it is determined that processing is to be ended (YES of S417), the present processing ends. Whether to end processing is determined based on, for example, the content of the operation performed by the user with respect to the operation unit 208.

[Processing in Power Receiving Apparatus]

Figure 5A:
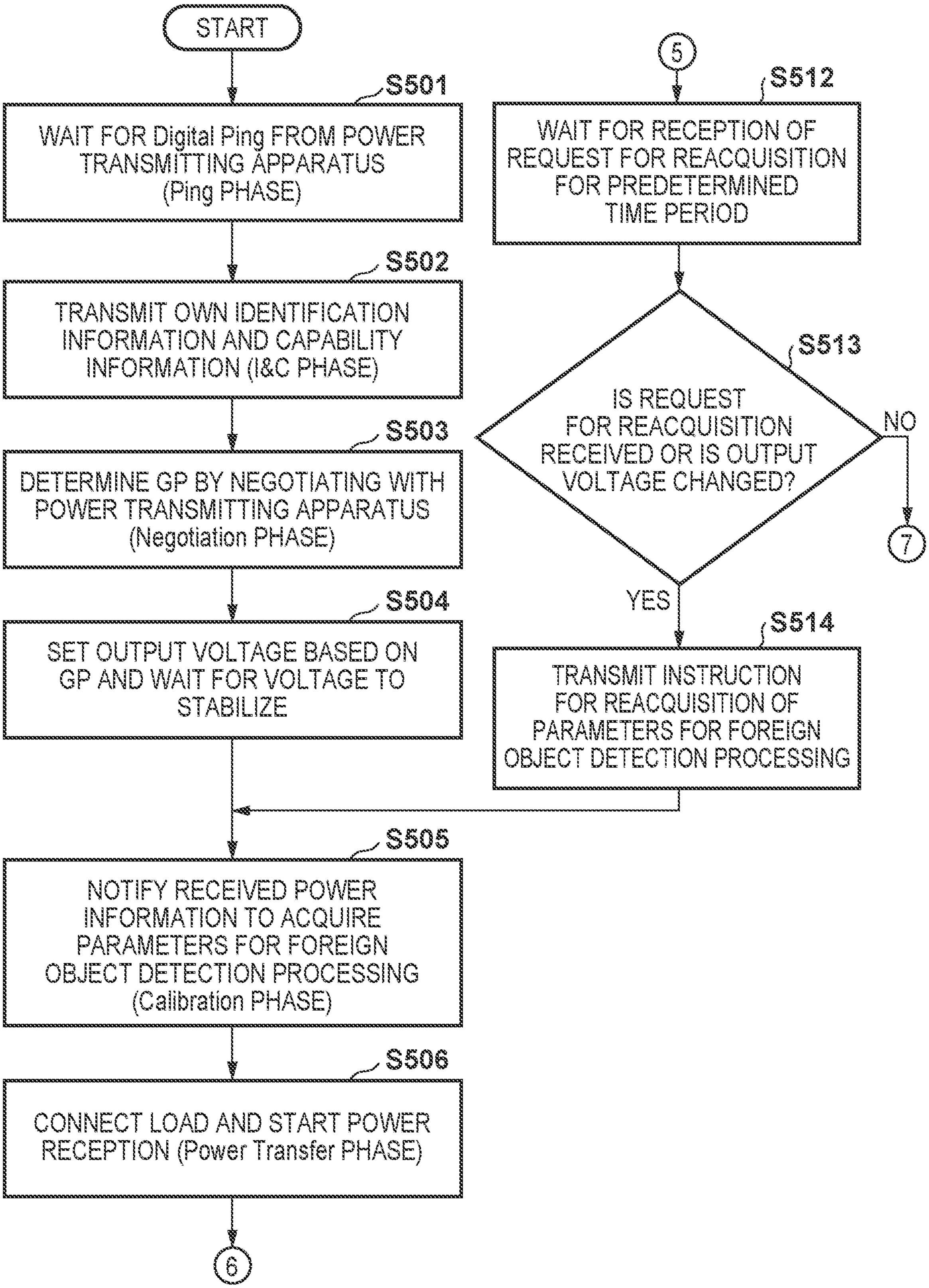
FIG. 5A is a flowchart showing an exemplary flow of processing of the power receiving apparatus according to the first embodiment.
Figure 5B:
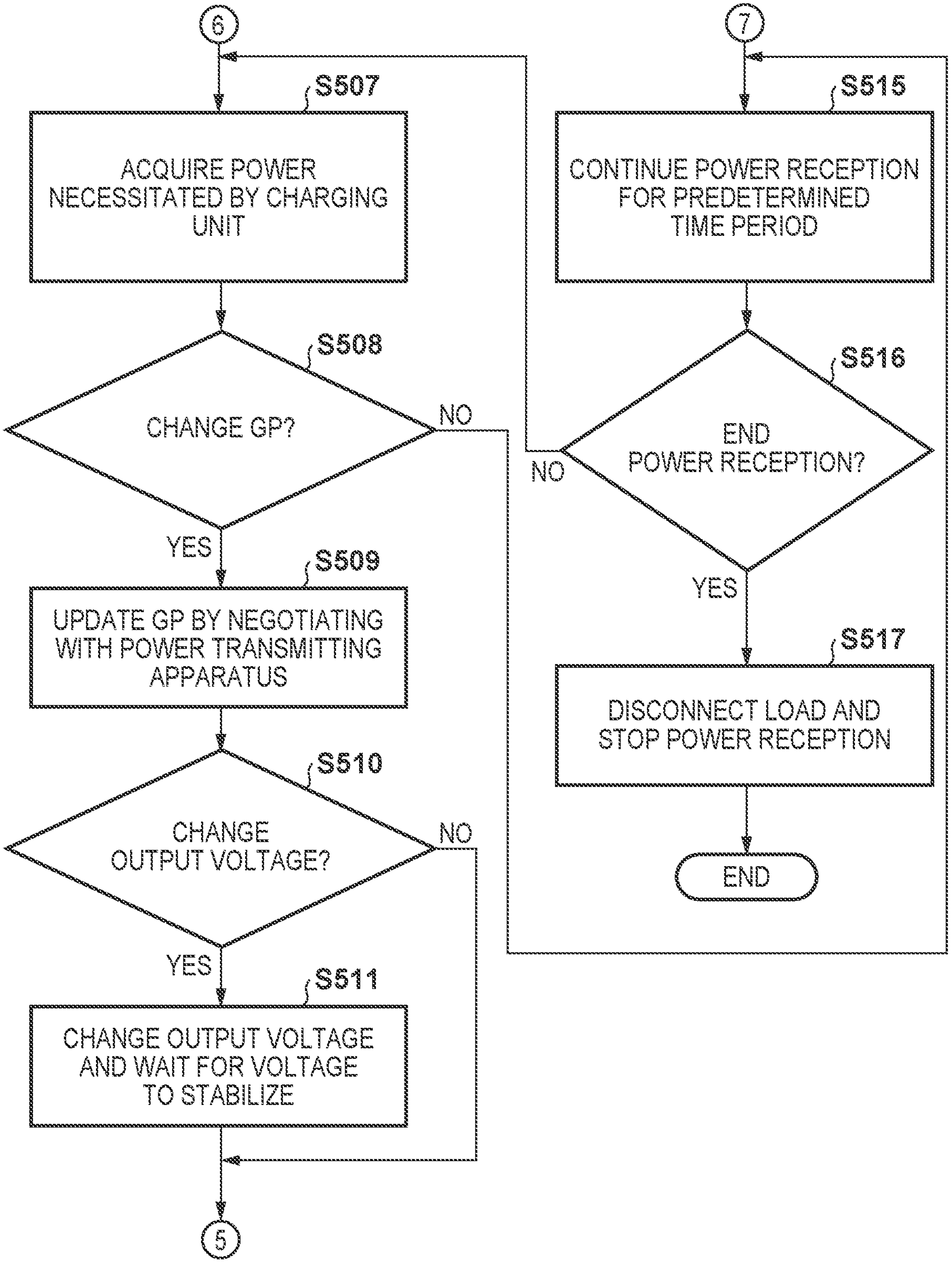
FIG. 5B is a flowchart showing an exemplary flow of processing of the power receiving apparatus according to the first embodiment.

Subsequently, a description is given of an exemplary flow of processing executed by the RX 102 with use of FIG. 5A and FIG. 5B. Hereinafter, FIG. 5A and FIG. 5B are collectively referred to as FIG. 5. The present processing can be realized by, for example, the control unit 301 of the RX 102 executing a program that has been read out from the memory 309. The present processing also includes processing in the reacquisition instruction unit 312. Note that at least a part of the procedure of the present processing to be described below may be realized by hardware. In this case, the hardware can be realized by, for example, automatically generating a dedicated circuit that uses a gate array circuit, such as an FPGA, from a program for realizing each processing step with use of a predetermined compiler. Also, the present processing can be started in response to power-ON of the RX 102, in response to activation of the RX 102 caused by provision of power from the battery 302 or the TX 101, or in response to an instruction for starting a wireless charging application input by a user of the RX 102. Note that the present processing may be started by another trigger.

After starting processing related to power transmission/reception, the RX 102 executes processing that is defined as the Selection Phase and the Ping Phase of the WPC standards, and waits for itself to be placed on the TX 101 (S501). Then, the RX 102 detects that it has been placed on the charging stand 103 of the TX 101 by, for example, detecting a Digital Ping from the TX 101. Then, upon detecting the Digital Ping, the RX 102 transmits an SS Packet including a received voltage value to the TX 101.

Upon detecting the placement of itself on the charging stand 103 of the TX 101, the RX 102 performs the aforementioned communication in the I&C Phase and transmits identification information and device configuration information (capability information) to the TX 101 with use of the communication unit 306 (S502). Then, the RX 102 negotiates with the TX 101 and determines GP by way of communication in the Negotiation Phase (S503). Specifically, communication in the Negotiation Phase is performed based on a Specific Request Packet shown in the communication sequence 7*b* of FIG. 7 and on a response thereto, as has been described in connection with processing in the power transmitting apparatus.

The output power setting unit 311 determines an output voltage for providing power from the power receiving unit 303 to the charging unit 313 based on GP determined in S503, and sets the output voltage on the charging unit 313 (S504). This processing also includes processing for, after the output power setting unit 311 has set the output voltage, waiting for this voltage to be stably output to the charging unit 313.

Table 1002 of FIG. 10 shows examples of the output voltage determined based on GP. By referring to table 1002, the output power setting unit 311 can determine, for example, an output voltage of 5 volts for a case where GP is 5 watts, an output voltage of 9 volts for a case where GP is 15 watts, and so on. Here, it is assumed that each value of table 1002 is a value that has been determined in advance, based on the electrical properties of the charging unit 313 of the RX 102, in order to perform efficient charging, and is held in the memory 309. Note that in a case where the charging unit 313 is an external device that operates based on the USB PD standard, the value of the output voltage may be acquired from the charging unit 313 via communication, or may be held in the memory 309 as a table prescribed by the USB PD standard. Note that in the present embodiment, it is assumed that table 1002 held in the RX 102 and table 1001 held in the TX 101 have the same contents. For example, in a case where both of the TX 101 and the RX 102 comply with the USB PD standard, the tables may have the same contents. Note that the contents may comply with other standards.

Subsequently, the RX 102 provides a notification about received power information for causing the TX 101 to acquire parameters for foreign object detection processing via the aforementioned communication in the Calibration Phase (S505). Subsequently, the RX 102 connects the charging unit 313, which is a load, to the power receiving unit 303, and starts power reception in the Power Transfer Phase (S506).

While receiving power wirelessly from the TX 101, the RX 102 acquires power necessitated by the charging unit 313 (S507). This value may be held in the memory 309 in advance, or may be acquired from an external device via communication in a case where the charging unit 313 is the external device. If the power necessitated by the charging unit 313 falls within the range of current GP (NO of S508), power reception is continued for a predetermined time period without changing GP (S515). The predetermined time period is, for example, one second. Thereafter, if the charging unit 313 has completed charging of the battery 302, power reception is stopped (YES of S516, S517), and the present processing ends. Otherwise (NO of S516), processing returns to S507 in order to continue charging.

Here, while power reception is continued in S515, the RX 102 repeatedly and regularly notifies the TX 101 of the current received power. The TX 101 detects a foreign object based on this information of the received power. A Received Power Packet of the WPC standards is used in providing a notification about the current received power. Here, a Received Power Packet is also used in the aforementioned communication in the Calibration Phase. For this reason, the RX 102 makes it possible to distinguish whether it is a notification for causing the TX 101 to store parameters for foreign object detection processing in the Calibration Phase, or a notification about the current received power for performing foreign object detection processing in the TX 101.

Specifically, this is done by setting a Mode value of a Received Power Packet at 0. Note that another value different from a Mode value for the Calibration Phase may be used, or the foregoing identification may be performed based on an entity other than a Mode value. For example, the identification may be enabled by using different types of packets in the Calibration Phase and the Power Transfer Phase.

On the other hand, in a case where the acquisition of power necessitated by the charging unit 313 has resulted in the need to change GP (YES of S508), the RX 102 negotiates with the TX 101 and changes GP (S509). Here, in a case where GP is to be set at a predetermined magnitude or higher, the RX 102 may perform device authentication with respect to the TX 101 via communication. By performing device authentication, power of a predetermined magnitude or higher can be received only from the TX 101 that is guaranteed to satisfy conditions of the WPC standards and other standards. One example of device authentication is challenge-response communication that uses an electronic certificate.

Subsequently, the RX 102 determines the output voltage to the charging unit 313 based on the updated GP. The output voltage is determined by referring to table 1002 of FIG. 10. In a case where it is necessary to change the current output voltage (YES of S510), the output power setting unit 311 changes the output voltage to the charging unit 313, and waits for the voltage to stabilize (S511). In a case where it is not necessary to change the current output voltage (NO of S510), processing of S511 is skipped.

Subsequently, the RX 102 waits for reception of a request for reacquisition of parameters for foreign object detection processing from the TX 101 for a predetermined time period (S512). It is assumed that the predetermined time period in S512 is, for example, a time period longer than a time period that is required for the TX 101 to complete processing of S410 and S411 in a case where S409 of FIG. 4 has resulted in YES after the completion of the communication for updating GP, which has been described in connection with the communication sequence 7*b* of FIG. 7. Note, it is assumed that the value of this predetermined time period is held in the memory 309 in advance.

In a case where the request for reacquisition of parameters for foreign object detection processing has been received from the TX 101, or in a case where the output voltage has been changed in S511 (YES of S513), the RX 102 transmits an instruction for reacquisition of parameters for foreign object detection processing to the TX 101 (S514). Then, processing proceeds to S505, and processing in the Calibration Phase is executed again with the TX 101. On the other hand, in a case where the request for reacquisition of parameters for foreign object detection processing has not been received from the TX 101 and the output voltage has not been changed in S511 (NO of S513), processing proceeds to S515. Processing of S515 onward is as described earlier.

Here, the instruction for reacquisition of parameters for foreign object detection processing, which is transmitted by the RX 102, may be a packet of the WPC standards or may be another packet that can be recognized by the TX 101. Alternatively, in a case where the RX 102 has received the request for reacquisition of parameters for foreign object detection processing from the TX 101, an affirmation response (ACK) thereto may be used as the instruction for reacquisition. Furthermore, the instruction for reacquisition of parameters for foreign object detection processing transmitted by the RX 102 may be the same as a packet indicating the beginning of a Calibration Phase. That is to say, the RX 102 may issue the instruction for reacquisition of parameters for foreign object detection processing by transmitting F721 in the communication sequence 7*c* of FIG. 7. Consequently, the TX 101 clears parameters for foreign object detection processing that have already been stored, and starts communication in a Calibration Phase. That is to say, it reacquires parameters for foreign object detection processing.

Also, although FIG. 5 depicts processing in which an instruction for reacquisition of parameters for foreign object detection processing can be issued in a case where GP has been changed, no limitation is intended by this. For example, in a case where it is determined that GP is not to be changed in S508 (NO of S508), processing may proceed to S510 while skipping S509. In this way, regardless of a change in GP, the RX 102 issues the instruction for reacquisition in response to reception of the request for reacquisition from the TX 101 during power reception, and reacquisition of parameters for foreign object detection processing is executed (YES of S513). This enables the RX 102 to issue the instruction for reacquisition even in a case where the TX 101 has changed the input voltage and issued the request for reacquisition of parameters for foreign object detection processing without updating GP. Note that in this case, as the RX 102 monitors the reception of the request for reacquisition during power reception, it is permissible to adopt a configuration in which S511 and S512 are skipped in a case where the determination in S510 results in NO.

[System Operations]

Figure 6:
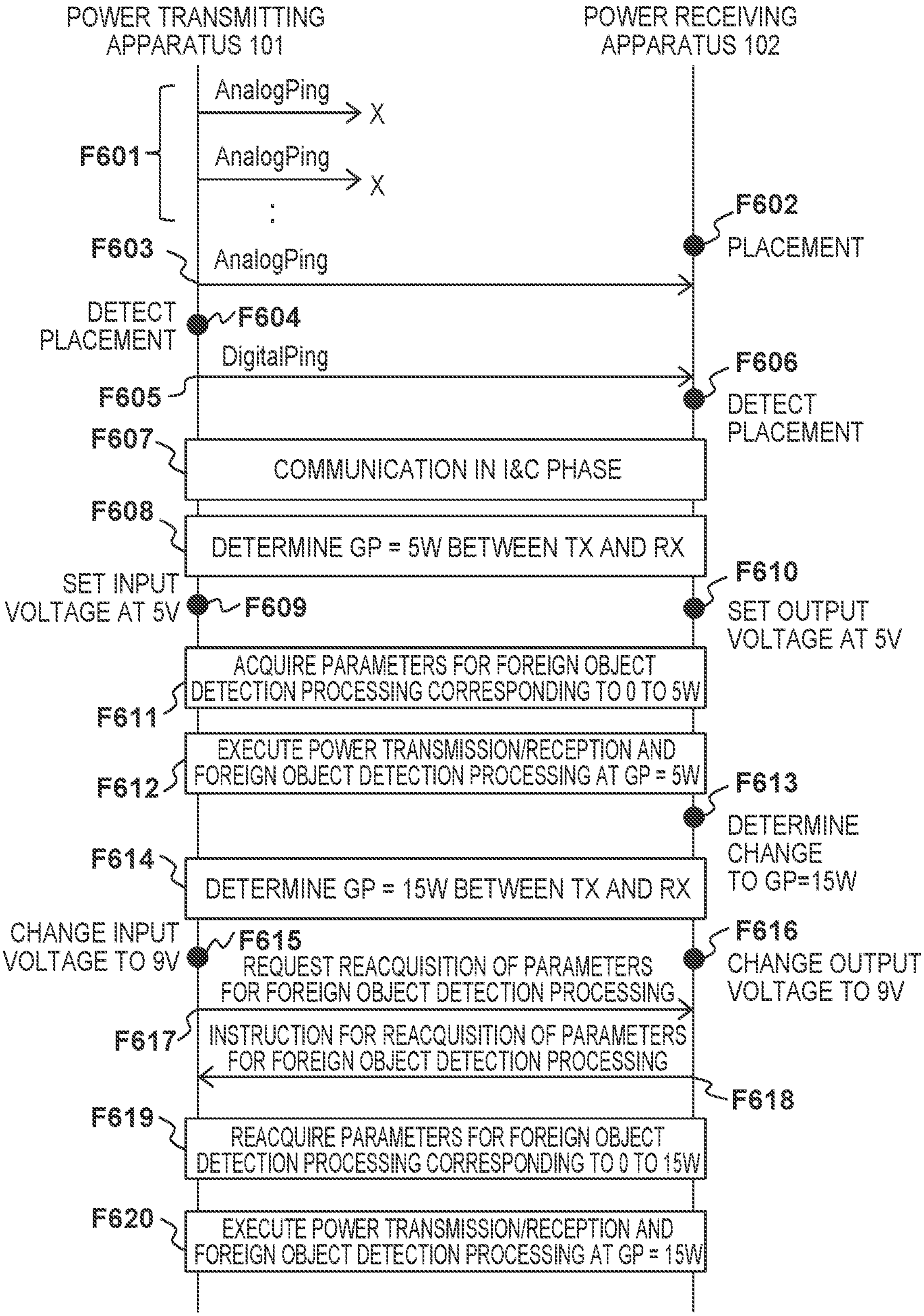
FIG. 6 is a diagram showing an exemplary flow of processing executed in the wireless charging system according to the first embodiment.

Using FIG. 6, the following provides a more specific description of an operational sequence of the TX 101 and the RX 102 that has been described using FIG. 4 and FIG. 5. FIG. 6 is a diagram showing an exemplary flow of processing executed in the wireless charging system according to the first embodiment. It is assumed that, in FIG. 6, time passes in the direction from up to down. It is assumed that, in an initial state, the RX 102 is not placed on the TX 101, and the load of the RX 102 (the charging unit 313) is not connected to the power receiving unit 303. Also, it is assumed that the power necessitated by the charging unit 313 of the RX 102 is 5 watts at first, and then increases to 15 watts after a Power Transfer Phase is started.

First, the TX 101 transmits an Analog Ping, and waits for an object to be placed on the charging stand 103 (F601, S501). Once the RX 102 has been placed (F602), the voltage or the current of the Analog Ping changes (F603). Based on this change, the placement detection unit 204 of the TX 101 detects that the object has been placed (F604). Upon detecting the placement of the object, the TX 101 transmits a Digital Ping (F605). The RX 102 detects the placement of itself on the TX 101 by receiving this Digital Ping (F606). Also, the TX 101 detects that the object placed on the charging stand 103 is the RX 102 via a response to the Digital Ping. Subsequently, the RX 102 transmits identification information and device configuration information (capability information) to the TX 101 via communication in an I&C Phase (F607, S402, S502).

Subsequently, GP is determined between the TX 101 and the RX 102 (F608, S403, S503). Here, GP is 5 watts as the RX 102 requests 5 watts, which is necessary at first. As GP is 5 watts, the TX 101 sets the input voltage (the voltage that the input voltage setting unit 211 inputs to the power transmitting unit 203) at 5 volts with reference to table 1001 (F609, S404). Similarly, the RX 102 sets the output voltage (the voltage that the output power setting unit 311 outputs to the charging unit 313) at 5 volts with reference to table 1002 (F610, S504).

Subsequently, the TX 101 acquires parameters for foreign object detection processing corresponding to 0 watts to 5 watts, which is GP, through processing in a Calibration Phase, and holds them in the memory 209 (F611, S405, S505). This processing in the Calibration Phase is executed in a state where the input voltage of the TX 101 is 5 volts and the output voltage of the RX 102 is 5 volts. As a result, the contents of parameters for foreign object detection processing that are acquired by and held in the TX 101 are equivalent to, for example, the graph 9*a* of FIG. 9.

Subsequently, the TX 101 starts foreign object detection processing and power transmission (F612, S406, S407), the RX 102 starts power reception (F612, S506), and power transmission/reception and foreign object detection processing are continued at GP=5 watts. This corresponds to the loop of S408→NO of S409→S412→NO of S413→S414→NO of S415→408 in FIG. 4. This also corresponds to the loop of S507→NO of S508→S515→NO of S516→S507 in FIG. 5. When the charging unit 313 necessitates 15 watts during power transmission/reception (F613, S507, YES of S508), GP is updated to 15 watts between the TX 101 and the RX 102 (F614, S408, S509). Once GP has been updated to 15 watts, the TX 101 changes the input voltage to 9 volts with reference to table 1001 (F615, YES of S409, S410), and transmits a request for reacquisition of parameters for foreign object detection processing (F617, S411). Meanwhile, the RX 102 also changes the output voltage to 9 volts with reference to table 1002 (F616, YES of S510, S511), and transmits an instruction for reacquisition of parameters for foreign object detection processing (F618, S512, YES of S513, S514).

As the TX 101 has received the instruction for reacquisition of parameters for foreign object detection processing (F618, S412, YES of S413), it starts processing in the Calibration Phase (S405). Meanwhile, the RX 102 also starts processing in the Calibration Phase (S514, S505). Thus, processing in the Calibration Phase is executed again between the TX 101 and the RX 102, and parameters for foreign object detection processing corresponding to 0 watts to 15 watts, which is GP at this point, are acquired and held in the TX 101 (F619, S405, S505). This processing in the Calibration Phase is executed in a state where the input voltage set by the input voltage setting unit 211 of the TX 101 is 9 volts, and the output voltage set by the output power setting unit 311 of the RX 102 is 9 volts.

As stated earlier, at the beginning of the Calibration Phase, the TX 101 clears parameters for foreign object detection processing that have been held up until that point. Furthermore, it is assumed in the present embodiment that parameters for foreign object detection processing are acquired at an interval of 5 watts. Therefore, information of respective points corresponding to 0 watts, 5 watts, 10 watts, and 15 watts is acquired as parameters for foreign object detection processing. Furthermore, at this time, the input voltage setting unit 211 of the TX 101 and the output power setting unit 311 of the RX 102 are each in a state where 9 volts, which is the voltage based on GP, has been set thereon. That is to say, they are in a state that is electrically different from the state where 5 volts has been set on each of them in F611. Therefore, as a result of calibration processing in F619, point A', point B', point C', and point D' of a graph 9*b*, which are different from point A and point B of the graph 9*a* of FIG. 9, are acquired and held in the TX 101 as parameters for foreign object detection processing. Thereafter, with use of parameters for foreign object detection processing shown in the graph 9*b* of FIG. 9, power transmission/reception and foreign object detection are performed at GP=15 watts between the TX 101 and the RX 102 (F620, S406, S407, S506).

In the aforementioned operations, when GP has changed from 5 watts to 15 watts, the input voltage and the output voltage change to 9 volts in the TX 101 and the RX 102 (F614 to F616), and parameters for foreign object detection processing are reacquired in this state (F619). That is to say, in a case where the electrical states of both of the TX 101 and the RX 102 have changed, parameters that have been updated in accordance with the states following that change are used in foreign object detection processing. In this way, a foreign object can be detected more accurately.

Note that although the TX 101 according to the aforementioned embodiment transmits a request for reacquisition of parameters for foreign object detection processing after changing the input voltage (S410, S411), no limitation is intended by this. The input voltage may be changed within a predetermined time period after the request for reacquisition of parameters for foreign object detection processing is transmitted. At this time, after the request for reacquisition of parameters for foreign object detection processing has been received (YES of S513), the RX 102 waits for a predetermined time period until the change of the input voltage is completed on the TX 101 side, and then transmits an instruction for reacquisition of parameters for foreign object detection processing (S514). This predetermined time period includes a time period from the setting of the new input voltage to stabilization of this input voltage. In the case of this implementation, too, it is possible to reacquire parameters for foreign object detection processing in a state where the input voltage has been changed, that is to say, in a state where the electrical state of the TX 101 has changed. Note that in the foregoing, it is permissible to wait for the TX 101 to provide a notification about completion of changing of the input voltage, instead of waiting for the predetermined time period. Alternatively, the RX 102 may monitor the received voltage from the TX 101, and determine that changing of the input voltage in the TX 101 has been completed in a case where the received voltage has changed significantly; in this case, the notification from the TX 101 about completion of changing of the input voltage is not necessary. In either case, it is possible to reacquire parameters for foreign object detection processing in a state where the input voltage has been changed, that is to say, in a state where the electrical state of the TX 101 has changed.

Also, the TX 101 may store parameters for foreign object detection processing in table 800 of FIG. 8 into the memory 209 in association with information of the input voltage that was set when they were acquired. At this time, in a case where the beginning of a Calibration Phase has been identified, the TX 101 keeps holding the parameters for foreign object detection processing in table 800 without clearing them. After the input voltage has been changed (S410), in a case where parameters for foreign object detection processing that are associated with this input voltage have already been held, the TX 101 replaces the parameters for foreign object detection processing with parameters for foreign object detection processing that were held in association with the changed input voltage. This can suppress multiple executions of reacquisition of parameters for foreign object detection processing in the state with the same input voltage, and can reduce a time period until completion of charging by continuing power transmission accordingly.

Also, the TX 101 may be configured to provide a notification to a user via the notification unit 207 in a case where parameters for foreign object detection processing are to be reacquired. This notification enables the user to learn that power transmission for charging is temporarily stopped for the purpose of reacquisition of parameters for foreign object detection processing. For example, in a power receiving apparatus in which an LED is lit during charging of the RX 102, there are cases where the LED becomes unlit when power transmission for charging is temporarily stopped. At this time, the user can learn that the unlit LED does not mean a failure.

Second Embodiment

The first embodiment has been described in relation to a case where table 1002 held in the RX 102 and table 1001 held in the TX 101 have the same contents. A second embodiment will be described in relation to a case where the relationship between GP and the input voltage to the power transmitting unit 203 in the TX 101 is different from the relationship between GP and the output voltage to the power receiving unit 303 in the RX 102. For example, the RX 102 holds table 1102 of FIG. 11 in the memory 309 in place of table 1002 of FIG. 10. Also, the following describes a case where the power necessitated by the charging unit 313 of the RX 102 is 5 watts at first, then increases to 10 watts after a Power Transfer Phase is started, and thereafter further increases to 15 watts. Note that other configurations are similar to those of the first embodiment.

Figure 12:
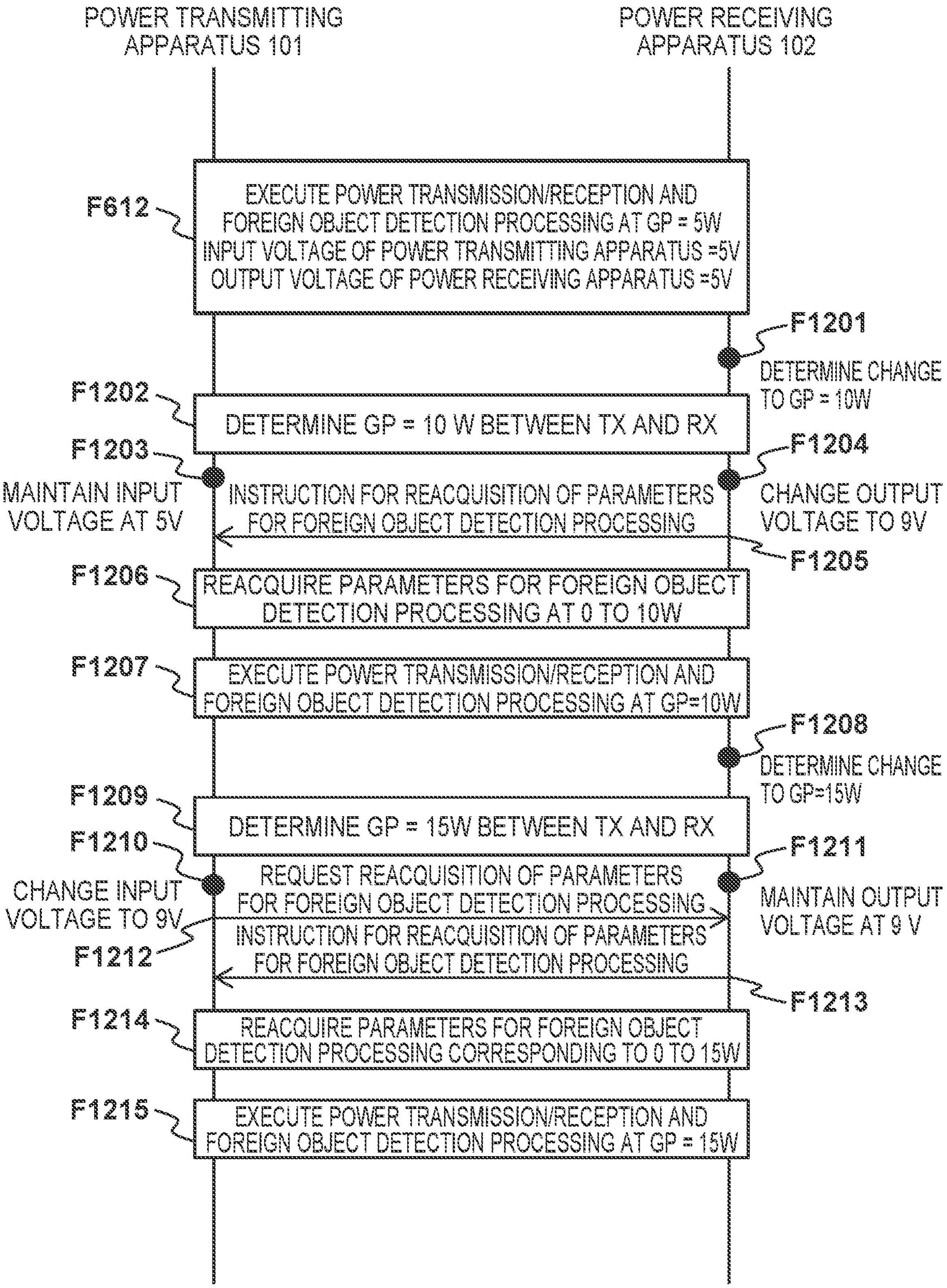
FIG. 12 is a diagram showing an exemplary flow of processing executed in the wireless charging system according to the second embodiment.

An operational sequence of the TX 101 and the RX 102 according to the second embodiment will be described using FIG. 12. FIG. 12 is a diagram showing an exemplary flow of processing executed in the wireless charging system according to the second embodiment. It is assumed that, in FIG. 12, time passes in the direction from up to down. The operations from the detection of placement to the execution of power transmission/reception and foreign object detection processing at a GP of 5 watts are the same as FIG. 6 (F601 to F612, S401 to S407, S501 to S506). In F612, the input voltage of the TX 101 is 5 volts, and the output voltage of the RX 102 is 5 volts.

When the charging unit 313 necessitates 10 watts (F1201, S507, YES of S508), GP is updated to 10 watts between the TX 101 and the RX 102 (F1202, S408, S509). Once GP has been updated to 10 watts, the TX 101 maintains the input voltage at 5 volts with reference to table 1001 (F1203, NO of S409), and waits for an instruction for reacquisition of parameters for foreign object detection processing from the RX 102 (S412). Meanwhile, the RX 102 changes the output voltage to 9 volts with reference to table 1002 (F1204, YES of S510, S511), and transmits an instruction for reacquisition of parameters for foreign object detection processing (F1205, S512, YES of S513, S514).

Upon receiving the instruction for reacquisition of parameters for foreign object detection processing, the TX 101 starts processing in a Calibration Phase (S412, YES of S413, S405). Meanwhile, the RX 102 that has transmitted the instruction for reacquisition of parameters for foreign object detection processing also starts processing in the Calibration Phase (S514, S505). Thus, processing in the Calibration Phase is executed again between the TX 101 and the RX 102, and parameters for foreign object detection processing corresponding to 0 watts to 10 watts, which is GP at this point, are acquired and held in the TX 101 (F1206, S405, S505). This processing in the Calibration Phase is executed in a state where the input voltage set by the input voltage setting unit 211 of the TX 101 is 5 volts, and the output voltage set by the output power setting unit 311 of the RX 102 is 9 volts. The parameters for foreign object detection processing that were acquired in this processing in the Calibration Phase are used in foreign object detection processing that is executed by the TX 101 during power transmission/reception at GP=10 watts (F1207, S406, S407, S506).

Thereafter, when the charging unit 313 necessitates 15 watts (F1208, S507, YES of S508), GP is updated to 15 watts between the TX 101 and the RX 102 (F1209, S408, S509). Once GP has been updated to 15 watts, the TX 101 changes the input voltage to 9 volts with reference to table 1001 (F1210, YES of S409, S410), and transmits a request for reacquisition of parameters for foreign object detection processing (F1212, S411). Meanwhile, the RX 102 maintains the input voltage at 9 volts with reference to table 1102 (F1211, NO of S510), and waits for a request for reacquisition of parameters for foreign object detection processing from the TX 101 (S512).

As the RX 102 has received the request for reacquisition of parameters for foreign object detection processing (F1212, S512, YES of S513), it transmits an instruction for reacquisition of parameters for foreign object detection processing (F1213, S514). As the TX 101 has received the instruction for reacquisition of parameters for foreign object detection processing (F1213, S412, YES of S413), it starts processing in the Calibration Phase (S405). Meanwhile, the RX 102 that has transmitted the instruction for reacquisition of parameters for foreign object detection processing also starts processing in the Calibration Phase (S514, S505). Thus, processing in the Calibration Phase is executed again between the TX 101 and the RX 102, and parameters for foreign object detection processing corresponding to 0 watts to 15 watts, which is GP at this point, are acquired and held in the TX 101 (F1214, S405, S505). This processing in the Calibration Phase is executed in a state where the input voltage of the TX 101 is 9 volts and the output voltage of the RX 102 is 9 volts. Power transmission/reception and foreign object detection are performed at a GP of 15 watts between the TX 101 and the RX 102 with use of parameters for foreign object detection processing that have been obtained as a result of the foregoing (F1215, S406, S407, S506).

As described above, according to the second embodiment, when GP has changed from 5 watts to 10 watts (F1202), the input voltage of the RX 102 is changed to 9 volts while the input voltage of the TX 101 is maintained at 5 volts (F1203, F1204). Parameters for foreign object detection processing are reacquired in a state where the input voltage of the TX 101 is 5 volts and the input voltage of the RX 102 is 9 volts (F1206). Also, when GP has changed from 10 watts to 15 watts (F1209), the input voltage of the TX 101 is changed to 9 volts, whereas the input voltage of the RX 102 is maintained at 9 volts (F1210, F1211). Then, parameters for foreign object detection processing are reacquired in a state where the input voltage of the TX 101 and the input voltage of the RX 102 are 9 volts (F1214). That is to say, in a case where the electrical state of one of the TX 101 and the RX 102 has changed, a foreign object is detected using parameters that have been updated in accordance with that state. In this way, a foreign object can be detected more accurately.

Third Embodiment

Figure 13A:
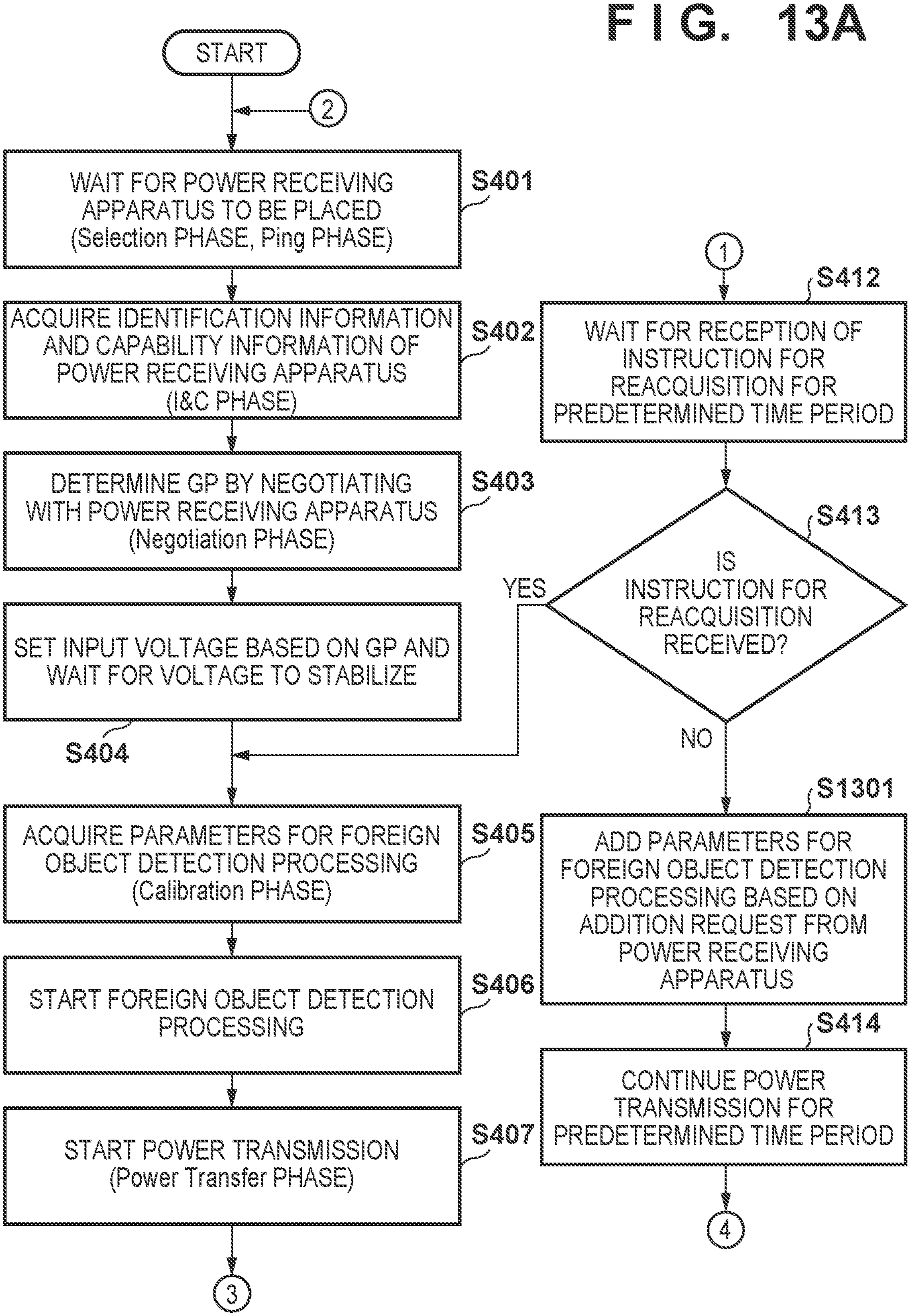
FIG. 13A is a flowchart showing an exemplary flow of processing of the power transmitting apparatus according to a third embodiment.
Figure 13B:
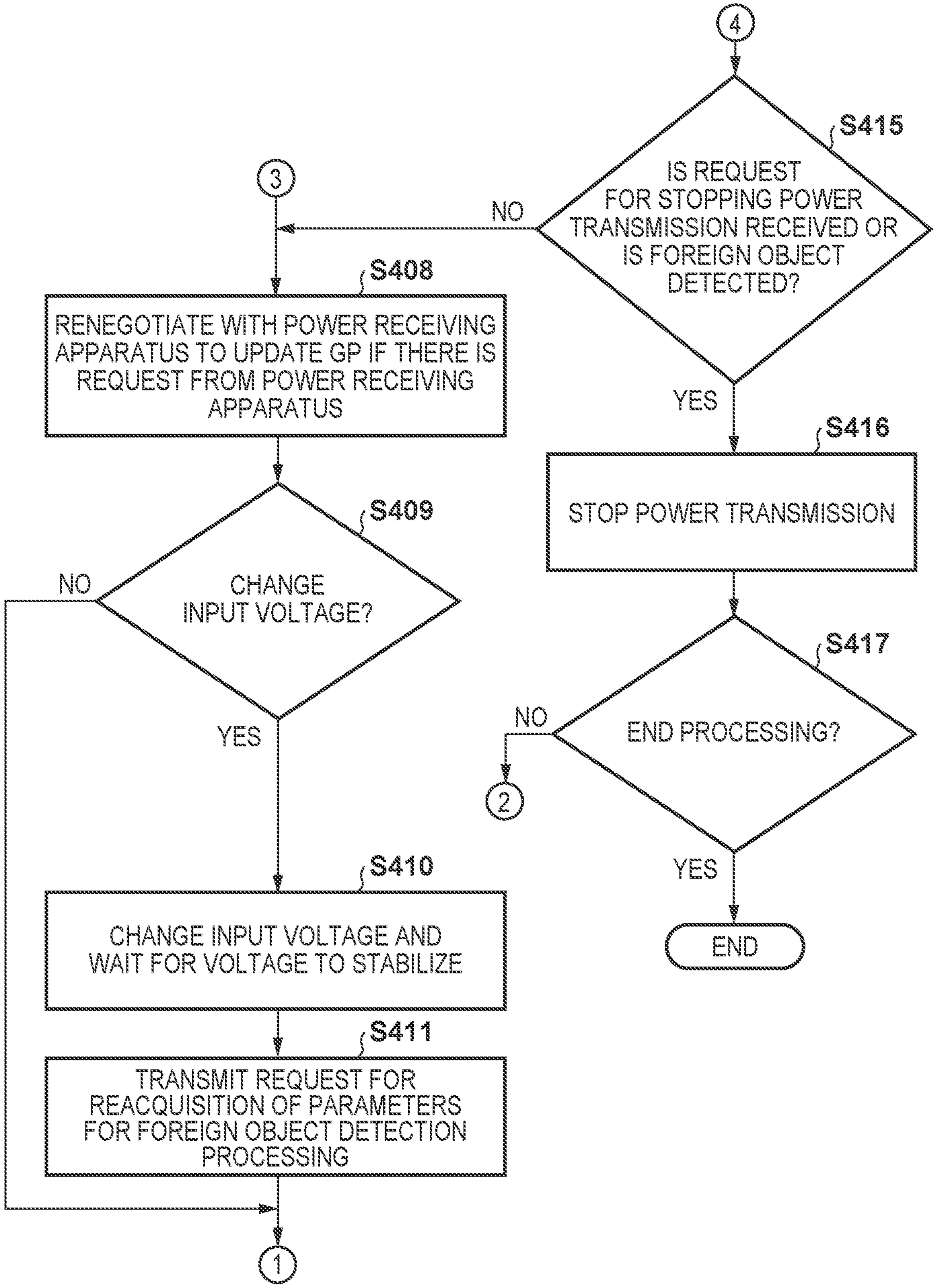
FIG. 13B is a flowchart showing an exemplary flow of processing of the power transmitting apparatus according to the third embodiment.
Figure 14A:
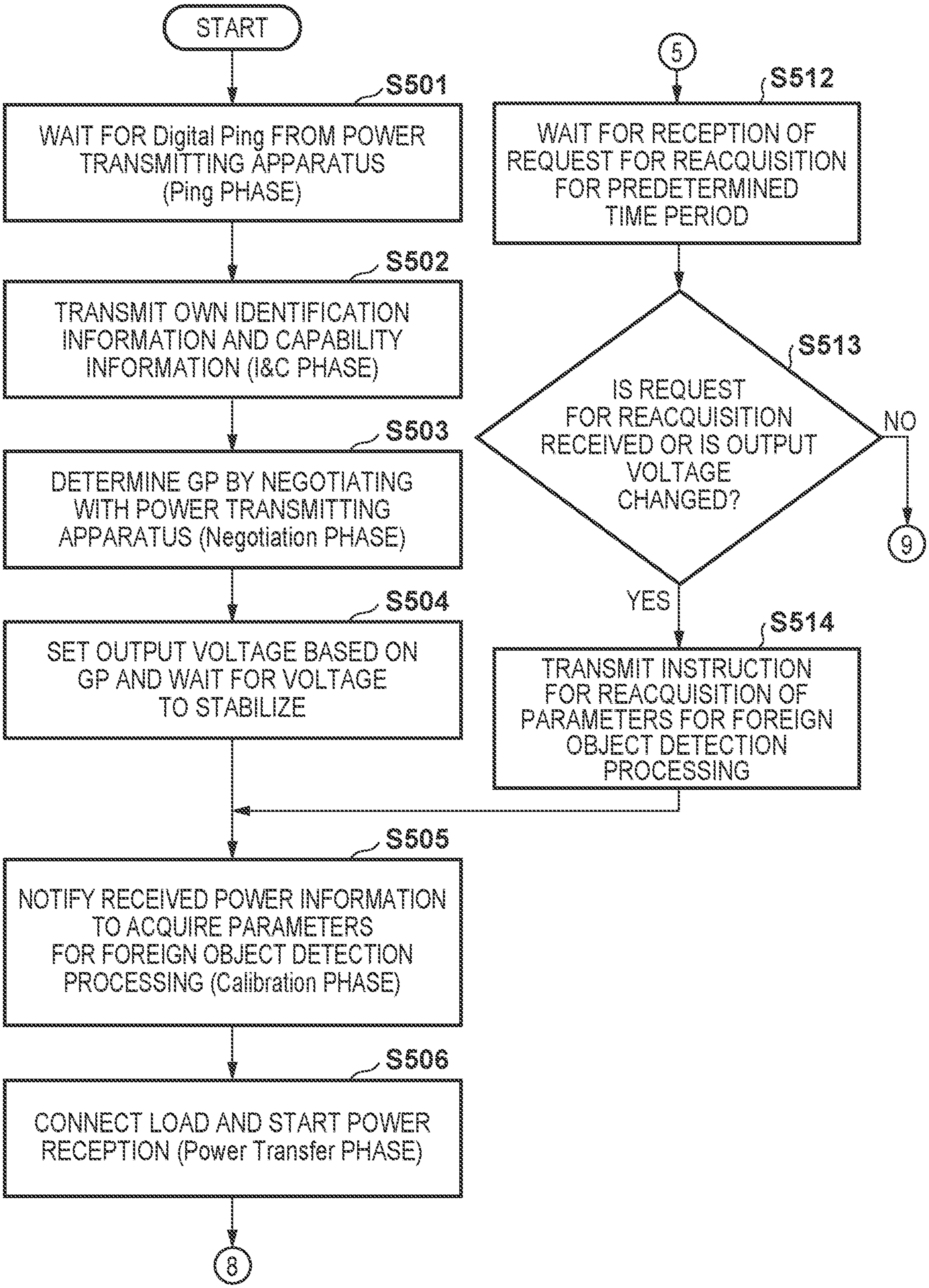
FIG. 14A is a flowchart showing an exemplary flow of processing of the power receiving apparatus according to the third embodiment.
Figure 14B:
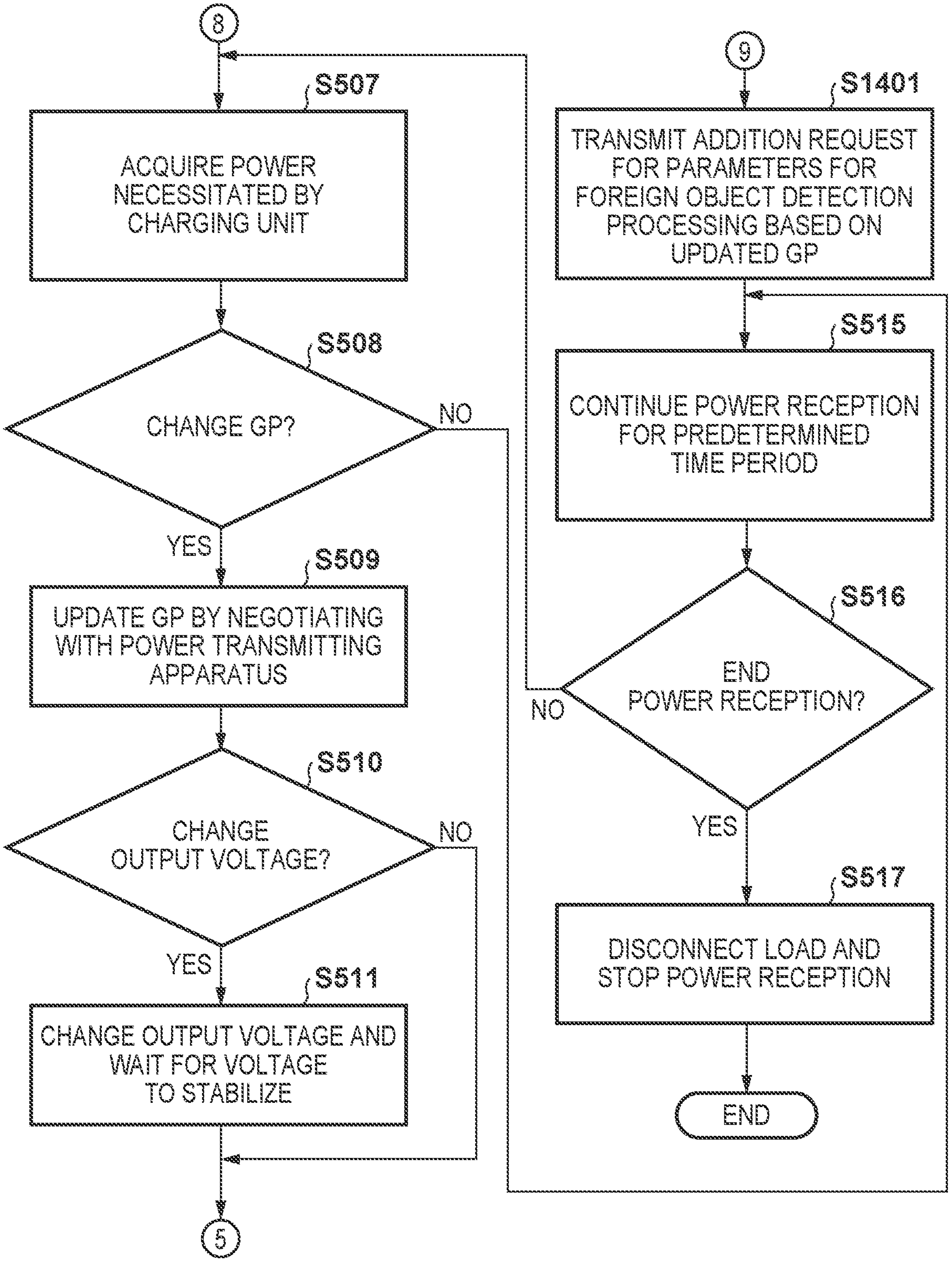
FIG. 14B is a flowchart showing an exemplary flow of processing of the power receiving apparatus according to the third embodiment.

In a third embodiment, in a case where GP has been updated, parameters for foreign object detection processing are added even if neither the input voltage of the TX 101 nor the output voltage of the RX 102 changes. Processing of TX 101 and processing of RX 102 according to the third embodiment are respectively shown in FIGS. 13A, 13B and FIGS. 14A, 14B. Hereinafter, FIG. 13A and FIG. 13B are collectively referred to as FIG. 13, and FIG. 14A and FIG. 14B are collectively referred to as FIG. 14. The difference from the first embodiment is that S1301 is added to processing of TX 101 in FIG. 4, and S1401 is added to processing of RX 102 in FIG. 5. Other configurations are similar to those of the first embodiment.

A description is now given of processing for a case where GP is updated from 5 watts to 10 watts in the third embodiment. First, GP is updated as a result of the execution of communication of the communication sequence 7*b* of FIG. 7 between the TX 101 and the RX 102 (S408, YES of S508, S509). In this case, based on table 1001 and table 1002 of FIG. 10, neither the input voltage of the TX 101 nor the output voltage of the RX 102 is changed (NO of S409, NO of S510). Therefore, the TX 101 does not transmit a request for reacquisition of parameters for foreign object detection processing, and the RX 102 does not transmit an instruction for reacquisition of parameters for foreign object detection processing. At this time, the RX 102 transmits an addition request for parameters for foreign object detection processing based on updated GP (NO of S513, S1401). Also, the TX 101 adds parameters for foreign object detection processing based on this addition request (NO of S413, S1301).

Here, a description is given of addition of parameters for foreign object detection processing. The RX 102 receives power at approximately 10 watts, which is updated GP, by temporarily increasing the received power in the power receiving unit 303, and notifies the TX 101 of the received power at that time together with the addition request for parameters for foreign object detection processing. Note that the notification about the received power and the addition request for parameters for foreign object detection processing may be transmitted together via one packet, or may be transmitted separately via different packets. For example, a Received Power Packet with a Mode value of 2, which has been described in the first embodiment, can be used. Upon receiving a Received Power Packet with a Mode value of 2, the TX 101 adds a pair of the received power and the power loss to table 800 (FIG. 8).

The TX 101 calculates a power loss from the value of the received power that was received together with the addition request for parameters for foreign object detection processing, and from the value of the transmission power in itself at that time, and adds the power loss as a parameter for foreign object detection processing. To describe a specific example, assume that the TX 101 acquired rows 801 and 802 of FIG. 8 in the first Calibration Phase of S405, and acquired the graph 9*a* of FIG. 9. Assume that, thereafter, a received power of 9.9 watts was received together with the addition request for parameters for foreign object detection processing in S1301, and the transmission power at that time was 13.4 watts, for example. In this case, row 803 that includes a power loss of 3.5 watts, which is the difference therebetween, is added as parameters for foreign object detection processing. Row 803 is equivalent to point C in a graph 9*c* of FIG. 9. In this way, the TX 101 can detect a foreign object more accurately in a case where the received power in the RX 102 and the power loss change nonlinearly.

Here, in a case where GP is changed from 5 watts to 10 watts, neither the input voltage of the TX 101 nor the output voltage of the RX 102 changes, and thus the electrical states do not change. Therefore, there is no need to reacquire all of the parameters for foreign object detection processing from 0 watts as in the graph 9*b* of FIG. 9, and parameters that have already been acquired can be appropriated. In this case, as has been described in the third embodiment, completing the addition processing without reacquiring parameters can shorten the time period in which power transmission for charging is stopped, and finish charging in a shorter period of time.

Note that in a case where updated GP is extremely high, the RX 102 may provide a notification about the values of multiple received powers at an interval of approximately 5 watts, for example. The TX 101 may derive power losses that respectively correspond to the multiple received powers that have been received, and add multiple parameters for foreign object detection processing. In this way, the accuracy of linear complementation increases, thereby allowing a foreign object to be detected more accurately.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

As described above, according to the present disclosure, even if the input voltage to a power transmitting unit has been changed in a power transmitting apparatus, a decrease in the accuracy of detection processing for detecting an object different from a power receiving apparatus can be suppressed.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

The invention claimed is:

1. A power receiving apparatus, comprising:

a power receiving unit that wirelessly receives power from a power transmitting apparatus;

a communication unit that communicates with the power transmitting apparatus; and a changing unit that changes a voltage, wherein the communication unit transmits a first received power packet including information indicating a first received power value, to the power transmitting apparatus, the changing unit changes, after the first received power packet is transmitted, a voltage of the power receiving apparatus based on an authentication to the power transmitting apparatus, and the communication unit transmits, after the first received power packet is transmitted and after the voltage of the power receiving apparatus is changed, a second received power packet including information indicating a second received power value, and a third received power packet including information indicating a third received power value, to the power transmitting apparatus.

2. The power receiving apparatus according to claim 1, wherein the voltage is a voltage to be provided to a load.

3. A method performed by a power receiving apparatus, the method comprising:

transmitting a first received power packet including information indicating a first received power value, to a power transmitting apparatus;

changing, after the first received power packet is transmitted, a voltage of the power receiving apparatus based on an authentication to the power transmitting apparatus; and transmitting, after the voltage of the power receiving apparatus is changed, a second received power packet including information indicating a second received power value, and a third received power packet including information indicating a third received power value, to the power transmitting apparatus.

4. The power receiving apparatus according to claim 1, further comprising:

a negotiation unit that negotiates with the power transmitting apparatus to change a transmission power.

5. The power receiving apparatus according to claim 1, wherein calibration processing is initiated upon the first received power packet being transmitted.

6. The power receiving apparatus according to claim 5, wherein the calibration processing is again initiated upon the second received power packet being transmitted.

7. The power receiving apparatus according to claim 5, wherein a parameter to be used in foreign object detection processing performed by the power transmitting apparatus is obtained by the calibration processing.

8. The power receiving apparatus according to claim 1, wherein the authentication is an authentication based on an electronic certificate.

9. The method according to claim 3, wherein calibration processing is initiated upon the first received power packet being transmitted.

10. The method according to claim 9, wherein the calibration processing is again initiated upon the second received power packet being transmitted.

11. The method according to claim 9, wherein a parameter to be used in foreign object detection processing performed by the power transmitting apparatus is obtained by the calibration processing.

* * * * *